US005974478A

United States Patent [19]
Wood et al.

[11] Patent Number: 5,974,478
[45] Date of Patent: Oct. 26, 1999

[54] SYSTEM FOR COMMAND PROCESSING OR EMULATION IN A COMPUTER SYSTEM, SUCH AS EMULATION OF DMA COMMANDS USING BURST MODE DATA TRANSFER FOR SOUND

[75] Inventors: Paul B. Wood; Marc M. Stimak, both of Austin, Tex.

[73] Assignee: Brooktree Corporation, San Diego, Calif.

[21] Appl. No.: 08/888,910

[22] Filed: Jul. 7, 1997

Related U.S. Application Data

[62] Division of application No. 08/337,924, Nov. 10, 1994, Pat. No. 5,732,279.

[51] Int. Cl.⁶ .................................................... G06F 13/28
[52] U.S. Cl. ............................ 710/22; 711/156; 704/201
[58] Field of Search ............................... 395/842; 710/22, 710/23, 24, 25, 26, 27, 28; 403/298; 711/156; 704/201

[56] References Cited

U.S. PATENT DOCUMENTS

| | | | |
|---|---|---|---|
| 4,313,160 | 1/1982 | Kaufman et al. | 364/260 |
| 4,695,945 | 9/1987 | Irwin | 395/856 |
| 4,727,480 | 2/1988 | Albright et al. | 395/500 |
| 4,755,937 | 7/1988 | Glier | 364/200 |
| 4,821,180 | 4/1989 | Gerety et al. | 395/842 |
| 4,937,861 | 6/1990 | Cummins | 380/2 |
| 4,994,912 | 2/1991 | Lumelsky et al. | 358/140 |

(List continued on next page.)

FOREIGN PATENT DOCUMENTS

| | | |
|---|---|---|
| 384 257 | 8/1990 | European Pat. Off. |
| 510 639 | 10/1992 | European Pat. Off. |
| 0 597 218 A1 | 5/1994 | European Pat. Off. |
| 0 675 478 A1 | 10/1995 | European Pat. Off. |
| WO 91/18345 | 11/1991 | WIPO |
| WO 93/21574 | 10/1993 | WIPO |

OTHER PUBLICATIONS

Developer Kit for Sound Blaster™, Hardware Programming Reference, 2nd Edition, Oct. 1993, Creative Labs, pp. 3–1 to 3–29.

Warren Andrews, "PCI promises solution to local–bus bottleneck," *Computer Design*, vol. 31, No. 8, Aug. 1992, pp. 36, 38 & 40.

"The 8259A Programmable Interrupt Controller", John Uffenbeck, The 8086/8088 Family Design, Programming, and Interfacing, John Uffenbeck, pp. 451–467, 1987.

*Primary Examiner*—Thomas C. Lee
*Assistant Examiner*—Harold Kim
*Attorney, Agent, or Firm*—Fish & Richardson P.C.

[57] ABSTRACT

A system and method for providing sound in a computer are disclosed. An audio module for controlling digitized sound I/O is included in a media stream controller. The media stream controller may also coordinate graphics and video which allows multiple media subsystems to be supported from a single bus device. A software application may initiate sound data transfer by sending a conventional DMA mode command to the media stream controller. The media stream controller activates an audio interrupt service routine which processes the request without using a conventional DMA controller. Digital sound data is transferred across a local bus using high speed burst mode block transfer commands and is buffered by the media stream controller in a display memory. Concurrently, the media stream controller may output sound data from the display memory to a sound output device using a double buffering method. Alternatively, the media stream controller may read sound data from a sound input device and store it in the display memory. The audio interrupt service routine may be activated to transfer the sound data in blocks to a software application. After sound data transfer is complete the audio interrupt service routine may reset the count in the DMA controller to provide compatibility with software applications written for DMA mode transfer. Thus high speed burst mode block transfer may be used with sound data to free up bandwidth for video, graphics and other uses, and yet still provide compatibility with conventional DMA mode sound I/O.

20 Claims, 9 Drawing Sheets

U.S. PATENT DOCUMENTS

| | | | |
|---|---|---|---|
| 5,083,119 | 1/1992 | Trevett et al. | 340/723 |
| 5,103,309 | 4/1992 | Hara | 358/141 |
| 5,129,036 | 7/1992 | Dean et al. | 395/2 |
| 5,150,456 | 9/1992 | Wu et al. | 395/114 |
| 5,192,999 | 3/1993 | Graczyk et al. | 358/85 |
| 5,229,855 | 7/1993 | Siann | 358/183 |
| 5,243,447 | 9/1993 | Bodenkamp et al. | 345/133 |
| 5,245,322 | 9/1993 | Dinwiddie, Jr. et al. | 345/115 |
| 5,274,779 | 12/1993 | Stewart et al. | 395/425 |
| 5,276,458 | 1/1994 | Sawdon | 345/132 |
| 5,283,819 | 2/1994 | Glick et al. | 379/90 |
| 5,289,584 | 2/1994 | Thome et al. | 395/436 |
| 5,297,231 | 3/1994 | Miller | 395/2.1 |
| 5,305,436 | 4/1994 | Mundkur | 395/162 |
| 5,325,489 | 6/1994 | Mitsushira et al. | 395/842 |
| 5,333,135 | 7/1994 | Wendorf | 370/94.1 |
| 5,333,299 | 7/1994 | Koval et al. | 395/550 |
| 5,355,146 | 10/1994 | Chiu et al. | 345/156 |
| 5,355,391 | 10/1994 | Horowitz et al. | 375/36 |
| 5,367,301 | 11/1994 | Stiltner et al. | 341/144 |
| 5,369,617 | 11/1994 | Munson | 365/219 |
| 5,369,729 | 11/1994 | Norris | 395/2.67 |
| 5,371,518 | 12/1994 | Hannah | 345/200 |
| 5,381,538 | 1/1995 | Amini et al. | 395/425 |
| 5,386,493 | 1/1995 | Degen et al. | 395/2.76 |
| 5,392,407 | 2/1995 | Heil et al. | 395/325 |
| 5,402,147 | 3/1995 | Chen et al. | 345/115 |
| 5,406,306 | 4/1995 | Siann et al. | 345/115 |
| 5,440,336 | 8/1995 | Buhro et al. | 348/13 |
| 5,485,624 | 1/1996 | Steinmetz et al. | 395/775 |
| 5,513,329 | 4/1996 | Pecone | 395/281 |
| 5,515,474 | 5/1996 | Deacon et al. | 395/2.1 |
| 5,519,684 | 5/1996 | Iizuka et al. | 369/93 |
| 5,553,220 | 9/1996 | Keene | 395/154 |
| 5,655,145 | 8/1997 | Chejlava, Jr. et al. | 395/821 |
| 5,655,151 | 8/1997 | Bowes et al. | 395/842 | ical advances in processor, display and audio technology
SYSTEM FOR COMMAND PROCESSING OR EMULATION IN A COMPUTER SYSTEM, SUCH AS EMULATION OF DMA COMMANDS USING BURST MODE DATA TRANSFER FOR SOUND This application is a divisional of application Ser. No. 08/337,924, filed Nov. 10, 1994, now U.S. Pat. No. 5,732, 279.

BACKGROUND OF THE INVENTION

1. Copyright Authorization

A portion of the disclosure of this patent document contains material which is subject to copyright protection. The copyright owner has no objection to the facsimile reproduction by any one of the patent disclosure, as it appears in the U.S. Patent and Trademark Office patent files or records, but otherwise reserves all copyright rights whatsoever.

2. Field of the Invention

The field of the present invention relates in general to a system and method for processing commands and transferring data in a computer system. More particularly, the field of the invention relates to a system and method for processing sound I/O commands and transferring sound data or the like across a high speed bus.

3. Background

Personal computers and work stations have evolved rapidly since their introduction nearly twenty years ago. Dramatic advances in processor, display and audio technology have transformed the personal computer into a multimedia appliance, capable of combining color graphics, video, and stereo sound in a single application.

As multimedia applications have developed, there has been an increased need for high speed and high bandwidth data transfers between main memory and input/output (I/O) devices. One approach used in expansion bus systems is direct memory access (DMA). A DMA controller takes over the bus and transfers data without intervention by the central processing unit (CPU). This method of data transfer has become prevalent for sound cards attached to an ISA expansion bus, and there is a large installed base of software applications designed for these sound cards.

However, data transfer across conventional expansion buses has not been able to keep pace with the demands of graphics and video systems used with modem multimedia software applications. Rather, graphics and video systems are increasingly being attached to the local bus where burst mode block data transfer initiated by the CPU supports higher data transfer rates than conventional DMA systems. In addition, local buses typically have a wider data path than expansion buses. However, local buses, such as the VESA local bus and the PCI bus, typically do not provide connections to the DMA controller.

Therefore, conventional sound systems and other systems requiring DMA are incompatible with these high speed local bus systems, and have remained on the expansion bus. It is a disadvantage of these systems that they are unable to take advantage of the higher data transfer rates of local bus systems. This has also led to the development of separate graphics, video, and audio subsystems on different buses having independent controllers with incompatible data types. This may lead to wasted memory space and memory bandwidth, duplicated bus interface logic, and wasted CPU cycles to manage independent subsystems.

What is needed is a system and method for emulating conventional DMA transfers while taking advantage of higher rates provided by other modes of transferring data.

What is also needed is a sound system that uses high speed data transfer while maintaining compatibility with the extensive installed base of software applications written for conventional sound systems. Preferably such a system would allow sound data to be transferred across a bus at a high rate of speed to free up bus bandwidth for video and graphics, yet would allow sound data to be played or recorded at a conventional lower frequency. What is also needed is a multimedia system that combines graphics, video, and audio in a single subsystem attached to the local bus or some other high speed I/O bus.

SUMMARY OF THE INVENTION

One aspect of the present invention provides a sound system and method for high speed data transfer that is easily adapted for compatibility with many existing sound cards and software applications. It is an advantage of this and other aspects of the present invention that desired data transfer modes may be used without obsoleting software applications written for existing sound cards. It is a further advantage of this and other aspects of the present invention that bus bandwidth may be freed up for use by other applications. It is a further advantage of this and other aspects of the present invention that modes of data transfer having a higher transfer rate may be used in place of conventional DMA transfer.

Another aspect of the present invention provides a system and method for emulating conventional DMA transfer while using a non-DMA mode of data transfer that allows connection to a non-DMA bus and/or provides a higher data transfer rate than conventional DMA transfer. It is an advantage of this and other aspects of the present invention that bus devices may be developed for a non-DMA bus without losing compatibility with applications designed for conventional DMA transfer.

Yet another aspect of the present invention provides for buffering blocks of sound data or the like for processing. It is an advantage of this and other aspects of the present invention that sound data or the like may be transferred across a bus at a high frequency while being processed by an I/O device at a lower, conventional frequency.

Yet another aspect of the present invention provides an interrupt service routine for processing commands sent to a bus device. Another aspect of the present invention provides an interrupt service routine for converting a command or result from a bus device such that the command or result may be compatibly passed along to a second interrupt service routine designed for a different system. It is an advantage of these and other aspects of the present invention that the complexity of the bus device may be reduced, and that the bus device may be used with interrupt service routines developed for other systems.

Another aspect of the present invention provides a subsystem combining video, graphics and sound. Yet another aspect of the present invention provides a display memory that is used to store sound related data as well as graphics and/or video related data. It is an advantage of these and other aspects of the present invention that multiple, incompatible subsystems for graphics, video and sound may be eliminated. It is another advantage of these and other aspects of the present invention that the number of memories and other components required for graphics, video and sound may be reduced.

BRIEF DESCRIPTION OF THE DRAWINGS

These and other features and advantages of the present invention will become more apparent to those skilled in the art from the following detailed description in conjunction with the appended drawings in which.

DESCRIPTION

Figure 1:
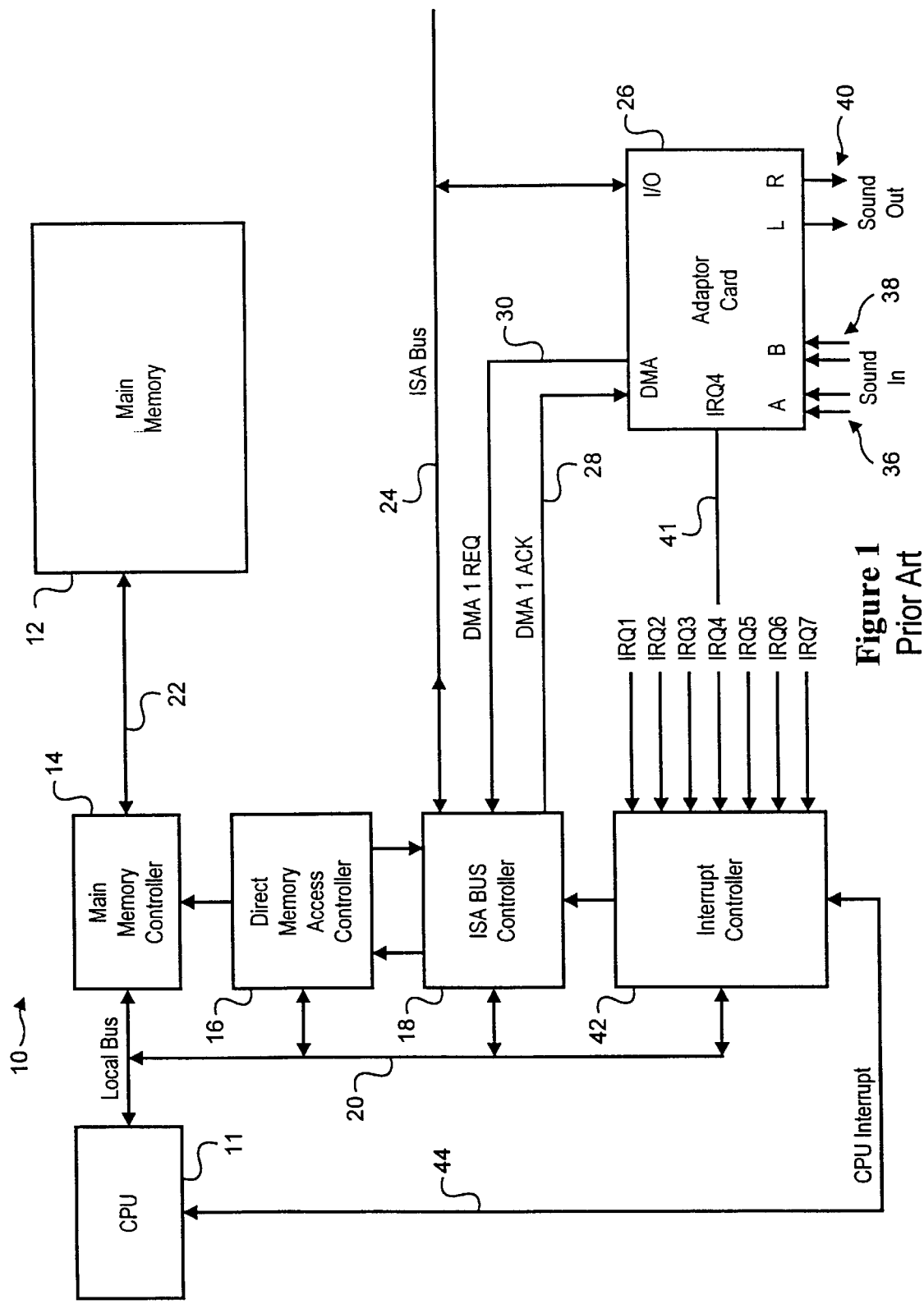
FIG. 1 is a simplified block diagram illustrating a system of the prior art for producing sound in a personal computer.

FIG. 1 is a simplified block diagram illustrating a conventional system, generally indicated at 10, for producing sound in a personal computer. Referring to FIG. 1, this system includes a central processing unit (CPU) 11 and a main memory 12 for storing both executable instructions and data for the system. The system also includes a main memory controller 14, a direct memory access (DMA) controller 16 and a bus controller 18 which is designated as an "ISA" bus controller corresponding to the Industry Standard Architecture (ISA) expansion bus generally provided in the prior art. For a more detailed discussion of the ISA expansion bus and related architecture, see Tom Shanley and Don Anderson, *ISA System Architecture,* PC System Architecture Series Volume 1 (MindShare Press 2nd ed. 1993) (hereinafter "ISA Architecture"), which is hereby specifically incorporated herein by reference. In the system of FIG. 1, the CPU 11, the main memory controller 14, the DMA controller 16, and the ISA bus controller 18 are connected to a local bus 20. A memory bus 22 connects the main memory controller 14 to the main memory 12.

An ISA expansion bus 24 extends from the ISA bus controller 18. The ISA bus includes control lines, address lines and data lines. When a device monitoring the ISA bus recognizes its address on the address lines, it then reads data from the data lines of the bus and takes appropriate actions. A device may also take control of the bus by becoming a bus master. When a device is a bus master, it may assert an address and data on the bus for another device to read. In addition, a device can make requests to the DMA and interrupt controller for special actions. A request to the DMA controller causes a data transfer between main memory and the requesting device on the ISA bus. A request to the Interrupt Controller will generate an interrupt and cause the CPU to execute a corresponding Interrupt Service Routine (ISR) stored in main memory.

Expansion slots are typically provided to allow expansion cards to be added to the ISA bus 24. For instance, FIG. 1 shows a conventional sound card 26 connected to the ISA bus. The sound card 26 is typically designed to be compatible with conventional digitized sound I/O. For more detailed information regarding conventional sound cards, see for example the Developer Kit for Sound Blaster™ Series (Creative Labs 2nd ed. Oct. 1993) which includes a Hardware Programming Reference (hereinafter "Hardware Reference"), a Programmer's Guide, and a Library Reference, each of which is hereby specifically incorporated herein by reference.

The exemplary sound card 26 in FIG. 1 has input lines, commonly designated "sound in", for receiving sound related data from an input device, such as a microphone or the like. These lines are indicated by pairs of lines 36 and 38, designated A and B respectively. The sound card 26 also has a pair of output lines 40, commonly designated "sound out", for outputting sound related data to an output device, such as a speaker or the like. The lines 40 in the pair are respectively designated as "L" and "R" to indicate sound output on a stereophonic basis from left and right channels.

The digitized sound I/O used by such cards ordinarily involves the use of I/O Ports, DMA transfers and interrupts. As shown in FIG. 1, sound card 26 is connected to the ISA bus controller by lines 28 and 30, designated as "DMA 1 ACK" and "DMA 1 REQ" respectively. These lines allow the sound card 26 to request DMA transfers and to receive acknowledgment from the DMA controller. For more information on direct memory access, see ISA Architecture at 367–387, which is hereby incorporated by reference.

As shown in FIG. 1, an interrupt line 41 extends from the sound card 26 to the interrupt controller 42 to allow the sound card 26 to generate interrupt requests. As will be readily apparent to one of ordinary skill in the art, the sound card 26 and associated software may be configured to use any of several interrupt request lines provided by the interrupt controller. In FIG. 1, the interrupt line 41 has been designated IRQ4 for illustrative purposes. Upon receiving an interrupt request, the interrupt controller may communicate with the CPU 11 via line 44. The interrupt controller 42 also has a common connection with the local bus 20. For more information on interrupts, see ISA Architecture at 331–366, which is hereby incorporated by reference.

A software application may produce sound in the system of FIG. 1 by accessing I/O ports on the sound card 26, either directly or through a driver. The sound card 26 is assigned a jumper selectable base address and the various ports used by the card are defined as offsets from that base address. For instance, the base address may be 220 hex. See Hardware Reference at 2—2. The sound card 26 of FIG. 1 includes a Reset port (at an offset of 6 hex), a Read Data port (at an offset of A hex), a Write Command/Data port (at an offset of C hex), a Write-Buffer Status port (also at an offset of C hex), and a Read-Buffer Status port (at an offset of E hex).

Before being used by the software application, the sound card 26 is reset by writing to the Reset port and by reading a "ready" byte from the Read Data port. This places the sound card in an initialized default state. Reading data from the sound card is then accomplished by checking the Read-Status port to ensure that there is data to be received from the Read Data port. After the Read-Status port has been checked, the data may be read from the Read Data port. For writing commands or data to the sound card 26, the software first checks the Write-Buffer Status port to ensure that the card is ready to receive commands or data. The commands or data may then be written to the Write Command/Data port. In addition, the interrupt service routine (ISR) used by the software application acknowledges an interrupt by reading the Read-Buffer status port once. Other sound cards may use a separate Interrupt Status port to acknowledge certain interrupts. See Hardware Reference at 2-1 to 2-7, which is hereby incorporated by reference.

Digitized sound I/O is carried out by transferring sound related data between the sound card 26 and the software application. The sound data may be in one of several formats known in the art, including but not limited to, Pulse Code Modulation (PCM) format and compressed Adaptive Delta Pulse Code Modulation (ADPCM) format. This formatted data may be transferred using a variety of techniques, including but not limited to, Direct Mode, Single-cycle DMA Mode, Auto-initialize DMA Mode, High-speed DMA Mode, and ADPCM DMA Mode. See Hardware Reference at 3-1 to 3-10, which is hereby incorporated by reference.

The DMA modes allow data to be transferred to the sound card 26 using direct memory access. When direct memory access is used, the DMA controller temporarily takes control of the bus and transfers data directly between main memory 12 and a specified I/O port. Since the data transfer is handled primarily by the hardware, it is faster than using program instructions to transfer data across the ISA bus. Generally, DMA transfer of sound data to the sound card 26 is handled by setting up a buffer in main memory containing a packet of sound data. The DMA controller is then programmed with the address and length of the buffer, and a command is sent to the Write Command/Data port of the sound card 26 to initiate DMA transfer. After the packet is transferred, the sound card 26 generates an interrupt request, and a corresponding ISR set up by the application software or a driver is executed. The ISR may then set up an additional sound packet for transfer or end the data transfer.

This process will now be described in more detail. However, it will be readily understood that this description is illustrative only, and that the DMA process will vary depending upon the particular type of transfer taking place. For more information on this process, see Hardware Reference at 3-11 to 3-29 which is incorporated herein by reference. Generally, for DMA transfer, the application or a driver first sets up an interrupt service routine (ISR), and enables the corresponding interrupt. To avoid confusion with other ISRS, the ISR set up by the application or driver will be referred to as the Driver ISR; however, it will be understood that a software application may set up this ISR directly and that a driver is not required. Using techniques known in the art, the Driver ISR is set up to be activated by an interrupt request from the sound card 26, and the previous ISR for that interrupt is saved so that it may be restored later.

Next, a buffer is set up in main memory for the data transfer. Due to constraints on conventional DMA controllers, the buffer typically cannot straddle a 64 KB physical page boundary. Thus, sound data may have to be transferred in packets each of which is no greater than 64 KB in size. After a packet is transferred the sound card 26 generates an interrupt, and the Driver ISR causes the next packet to be transferred.

After the buffer is set up, the DMA controller is programmed for the appropriate mode of data transfer (such as single-cycle or auto-initialize). Programming the DMA controller also involves enabling the appropriate DMA channel, and providing the base address and length of the buffer containing the packet in main memory.

Next, the sound card 26 is given a time constant which controls the rate of data transfer. This is accomplished by writing a Set Time Constant command to the Write Command/Data port on the sound card 26 followed by a one byte parameter specifying the time constant, as is known in the art. An I/O command is then sent to the sound card 26 to initiate DMA transfer. This is done by writing an I/O command to the Write Command/Data port on the sound card 26. For examples of I/O commands typically used in sound cards, see Hardware Reference at 6-1 to 6-29 which is incorporated herein by reference.

The sound card 26 then requests DMA transfer by asserting a logical 0 on the DMA 1 REQ line. This represents a request to the DMA controller 16 to obtain data from the base address of the buffer in main memory. Either a byte or a word is transferred, depending upon whether an 8-bit or 16-bit DMA channel is being used. When the sound data is provided, the DMA controller 16 decreases by an integer an internal count of the transfer length and increases by an integer the address used to retrieve data from the buffer.

When the ISA bus 24 receives the sound data, a logical 0 is asserted on the DMA 1 ACK line to indicate that the DMA request is being serviced. The sound card 26 then reads the sound data from the ISA bus 24 and outputs it on an output device, such as a speaker or the like to produce sound represented by the data. Every time the sound card 26 receives data from the ISA bus 24, it decreases a count of the transfer length that is maintained in a packet length register in the sound card 26.

This process is then repeated for subsequent pieces of sound data in the packet, until the count in the packet length register of the sound card 26 reaches zero (0). At this time, the entire packet in the buffer has been transferred, and the sound card 26 generates an interrupt request on its interrupt request line 41. This causes the Driver ISR to be activated. The Driver ISR preserves the machines status and determines whether there are more packets to transfer. If there are more packets of sound data, the ISR sets up a buffer for the next packet, configures the DMA controller, and issues an I/O command to the sound card 26. As is known in the art, this process may be simplified in auto-initialize mode. See Hardware Reference at 3-5 to 3-6, which is incorporated herein by reference.

The Driver ISR then acknowledges the interrupt from the sound card 26, and outputs an EOI (End Of Interrupt) to the Interrupt Controller 42. Then the machine status is restored and an IRET (Return from Interrupt) command is executed. This process continues until there are no more packets to be transferred between the application and the sound card 26. After the application is finished with the sound I/O, it then disables the interrupt and restores the original interrupt service routine.

The conventional system described above has several significant limitations. It requires that sound data be transferred across the ISA expansion bus, which has a limited data transfer rate and a high latency. The data transfer rate is limited by both the bandwidth of the data path (16 bits) and by the complex DMA transfer protocol used in the ISA system. This may be particularly disadvantageous in multimedia systems where a large amount of bandwidth must be allocated for video and graphics, or in other systems requiring large amounts of data to be transferred across a bus in addition to sound data.

To improve block transfer rates for video and graphics systems, local buses such as the VESA Local Bus and PCI Bus, or similar high speed buses using burst mode data transfer have been developed. For a description of high speed bus systems, and a comparison of data transfer rates with expansion buses, see Tom Shanley and Don Anderson, *PCI System Architecture*, PC System Architecture Series Volume 4 (MindShare Press 1994 2nd ed.) (hereinafter "PCI Architecture"), which is hereby specifically incorporated herein by reference. However, conventional ISA-based sound systems and the applications written for them may not be compatible with these high speed buses. This inhibits the development of complete local bus multimedia systems, including video, graphics, and sound, that are compatible with many existing software applications.

It should be noted that, traditionally, graphics, video, and audio subsystems have used separate memory spaces and bus connections as a result of independent controllers with incompatible data types. This may result in wasted memory space and memory bandwidth, duplicated bus interface logic, and wasted CPU cycles to manage independent subsystems. As a consequence, the cost of providing these capabilities has been relatively high.

Figure 2:
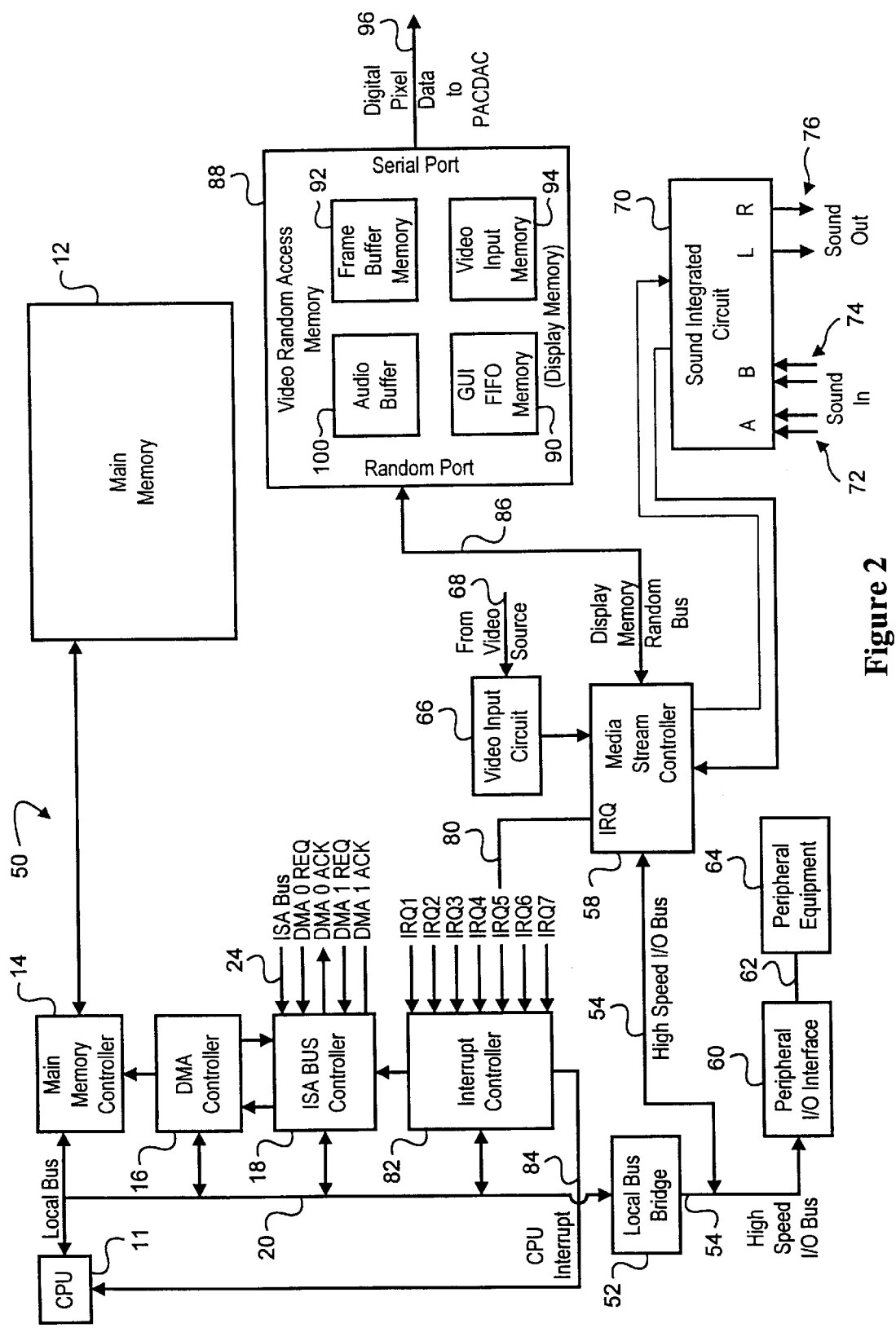
FIG. 2 is a simplified block diagram illustrating a system according to a first embodiment of the present invention.

FIG. 2 generally indicates a system according to a first embodiment of the present invention in block form at 50. The system of the first embodiment includes a number of the same components as the system shown in FIG. 1. These include the CPU 11, the main memory 12, the main memory controller 14, the DMA controller 16, the ISA bus controller 18, the local bus 20 and the ISA bus 24 connected as shown. One skilled in the art will appreciate the interconnection and operation of these components.

The system 50 shown in FIG. 2 also includes a local bus bridge 52 connected to the local bus 20. Preferably, in the first embodiment, the bridge 52 provides a PCI Bus compliant system although other bus systems such as a VESA local bus system may be supported. A high speed I/O bus 54 has a common connection with the bridge 52, with a peripheral I/O interface 60 and with a Media Stream Controller 58. While the high speed I/O bus 54 is coupled to the local bus using a bridge in the first embodiment, other embodiments of the present invention may be adapted to support other methods of connecting to the local bus, such as direct connection, buffered connection or connection through a combined cache/bridge. See PCI Architecture at 12-30, which is incorporated herein by reference. The peripheral I/O interface 60 is in turn connected through a peripheral bus 62 to peripheral equipment 64. The high speed I/O bus 54 in the first embodiment may be a VESA Local Bus or a PCI bus which provides a data bandwidth of thirty two (32) bits in parallel and which may in the future provide as many as sixty four (64) bits in parallel. The peripheral equipment 64 may illustratively be a printer which is operated in accordance with commands from the CPU 11.

Figure 3:
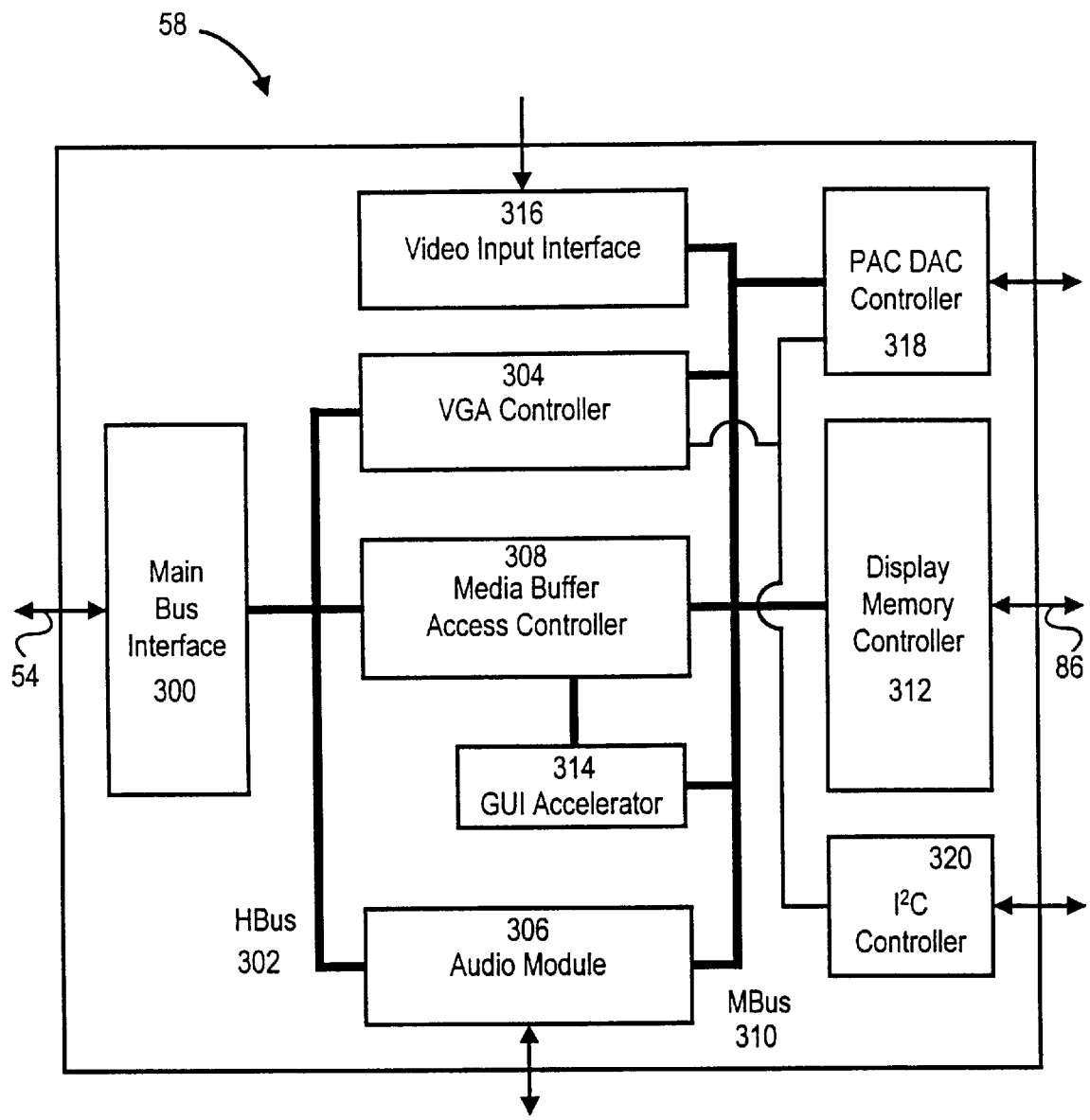
FIG. 3 is a block diagram showing in additional detail one of the blocks shown in FIG. 2, this block being designated as "Media Stream Controller" in FIG. 2.

The high speed I/O bus 54 shown in FIG. 2 is coupled to a Media Stream Controller 58 in the first embodiment shown as a single block in FIG. 2 and as a simplified block diagram in FIG. 3. The Media Stream Controller 58 may be disposed on an integrated circuit chip.

Referring to FIG. 3, the Media Stream Controller 58 of the first embodiment communicates with the I/O bus 54 through a Main Bus Interface 300. The Main Bus Interface is connected to an internal 3-state HBus 302 allowing communication with various functional agents or modules attached to the Hbus. These modules may include a VGA Controller 304 for graphics, an Audio Module 306 for sound, and a Media Buffer Access Controller 308 which may allow data to pass though to a separate display memory through an MBus 310 and Display Memory Controller 312. A GUI Accelerator 314 may also be provided as shown.

Other modules such as flash ROM or Yamaha OPL support may also be added to the Hbus. The VGA Controller 304 may communicate with, and is connected to, a PACDAC Controller 318 and an I$^2$C Controller 320. The PACDAC Controller 318 is also connected to the MBus 310. Each of the modules connected to the MBus may transfer data to or from a separate display memory via MBus 310, Display Memory Controller 312, and a random bus 86. In addition, the Media Stream Controller 58 may communicate with other portions of a multimedia I/O system through the Video Input Interface 316, Audio Module 306, Display Memory Controller 312, PACDAC Controller 318, and I$^2$C interface 320. Preferably, standard interfaces such as AES/EBU and I$^2$C are supported.

A first embodiment of the present invention provides a system which is compatible with many earlier ISA-based sound systems, yet resides on a local bus or other bus providing burst mode or high speed block data transfer. The first embodiment accepts commands in a prior art format, but bypasses the DMA controller for digitized sound I/O transfer. It should be understood, however, that the present invention is by no means limited to providing compatibility with ISA-based sound systems. It will be readily apparent to one of ordinary skill in the art that aspects of the present invention may be applied to provide compatibility with other I/O systems on different buses, including without limitation, the Extension to Industry Standard Architecture (EISA) expansion bus, the Micro Channel expansion bus, and the X-bus (extension to the expansion bus). For a description of these bus systems, see Tom Shanley, *EISA System Architecture*, PC System Architecture Series Volume 2 (MindShare Press 1993 rev. ed.), and PCI Architecture, each of which is hereby specifically incorporated herein by reference. In addition, the present invention may be advantageously applied even where compatibility is not an issue.

Referring to FIG. 2, the Media Stream Controller 58 receives inputs from a video input circuit 66. The video input circuit 66 receives video inputs through a bus 68 from a video source (not shown) which may be constructed in a conventional manner. The Media Stream Controller 58 also receives inputs from, and provides outputs to, a sound integrated circuit 70 which may be constructed in a conventional manner.

The sound integrated circuit 70 receives inputs relating to monaural sound on one of two pairs of lines 72 and 74 or relating to stereophonic sound on both pairs of lines. For example, the sound inputs on the pairs of lines 72 and 74 may be from microphones. The sound integrated circuit 70 may provide a sound output on a pair of lines 76. These lines are respectively designated as L (left) and R (right) to indicate the disposition of speakers for stereophonic sound. Preferably, a standard AES/EBU serial audio interface is used for communication between the Media Stream Controller 58 and sound integrated circuit 70.

A line 80 extends from the Media Stream Controller 58 to one of the input terminals of an interrupt controller 82 corresponding to the interrupt controller 42 in FIG. 1. As will be seen, the interrupt controller 82 has a plurality of input terminals respectively designated as IRQ1–IRQ7 and corresponding to the input terminals IRQ1–IRQ7 of the interrupt controller 42 in FIG. 1. An interrupt line 80 corresponding to the interrupt line 41 in FIG. 1 extends between the Media Stream Controller 58 and the interrupt controller 82. However, a line 80 is shown in FIG. 2 as extending to the IRQ 5 terminal as distinguished from the IRQ 4 terminal in FIG. 1. For the first embodiment, the Media Stream Controller 58 uses a different IRQ input than is used by the conventional ISA sound card of FIG. 1 to activate the Driver ISR. A line 84 corresponding to line 44 in FIG. 1 connects CPU 11 to Interrupt Controller 82.

A display memory random bus 86 is common with the Media Stream Controller 58 and a display memory 88 (also designated in FIG. 2 as a video random access memory). This display memory 88 has different portions. For example, the display memory 88 has a portion 90 designated as a "GUI FIFO memory" for storing commands on an overflow basis. The memory portion 90 and related portions of the system are disclosed in detail in copending application Ser. No. 08/337,439 filed on Nov. 10, 1994 in the names of David C. Baker and Michael D. Asal as joint inventors, titled "System for, and Method of, Processing in Hardware Commands Received from Software without Polling of the Hardware by the Software", assigned of record to the assignee of record of this application, and which is hereby incorporated herein by reference.

The display memory also includes a frame buffer memory 92 for storing graphics data, such as data for a look-up table, and a video input memory 94 for storing video data. A system for storing graphics data and video data in different portions of a display memory is disclosed in detail and claimed in U.S. Pat. No. 5,406,306 The outputs from the frame buffer memory 92 and the video input memory 94 are provided on a line 96 designated as "Digital Pixel Data to PACDAC".

The output on the line 96 may be introduced to a display monitor (not shown) to provide a visual image. The term "PACDAC" is an acronym to indicate a packet based digital-to-analog converter. The PACDAC may also include a random access memory. A PACDAC and related portions of the system are described in detail in copending application Ser. No. 08/214,787 (attorney's file D-2717) filed Mar. 16, 1994 in the names of David C. Baker and Jonathan I. Siann as joint inventors, titled "Multimedia Graphics System", assigned of record to the assignee of record of this application, and which is hereby incorporated herein by reference. The output on line 96 indicates that the binary information in the frame buffer memory 92 may represent positions in a look-up table and that these positions may have binary indications representing pseudo colors. These binary indications are converted to analog values by the digital-to-analog converters to provide the colors at the different pixel positions on the display monitor. As disclosed in U.S. Pat. No. 5,406,306, the video information in the video input memory 92 is converted to a form compatible with the graphics information for the frame buffer memory 92 and this converted video information is shown in the display monitor.

The media stream controller, display memory, and PACDAC may also cooperate to produce a composite video output signal. A composite video subsystem and related portions of the system are disclosed in detail in copending application Ser. No. 08/337,350 filed on Nov. 10, 1994 in the names of David C. Baker, Daniel P. Mulligan, and Eric J. Schell as joint inventors, titled "System and Method for Generating Video in a Computer System", assigned of record to the assignee of record of this application, and which is hereby incorporated herein by reference in its entirety.

A portion of the display memory is also used to provide an audio buffer 100. The audio buffer 100 is preferably a 32 KB buffer in the first embodiment, although other sizes including but not limited to 16 KB or 64 KB could be used. The audio buffer 100 is used to buffer sound data along with certain formatting and control information for the data before it is sent to, or received from, the sound integrated circuit 70. The buffering allows sound data to be transferred between main memory and the audio buffer 100 across the local bus 20 and high speed I/O Bus 54 at a high rate using burst mode data transfer, yet still allows sound data to be played or recorded through the sound integrated circuit at a different frequency. For instance, one word of sound data may be output to the Sound Integrated Circuit 70 every 20 $\mu$s even though the data transfer rate across the local and high speed I/O buses is much higher. Thus, the play and record frequency is decoupled from the data transfer rate. By transferring a block of sound data at high speed and by buffering it in the audio buffer, bus bandwidth can be freed up for other uses.

Figure 4:
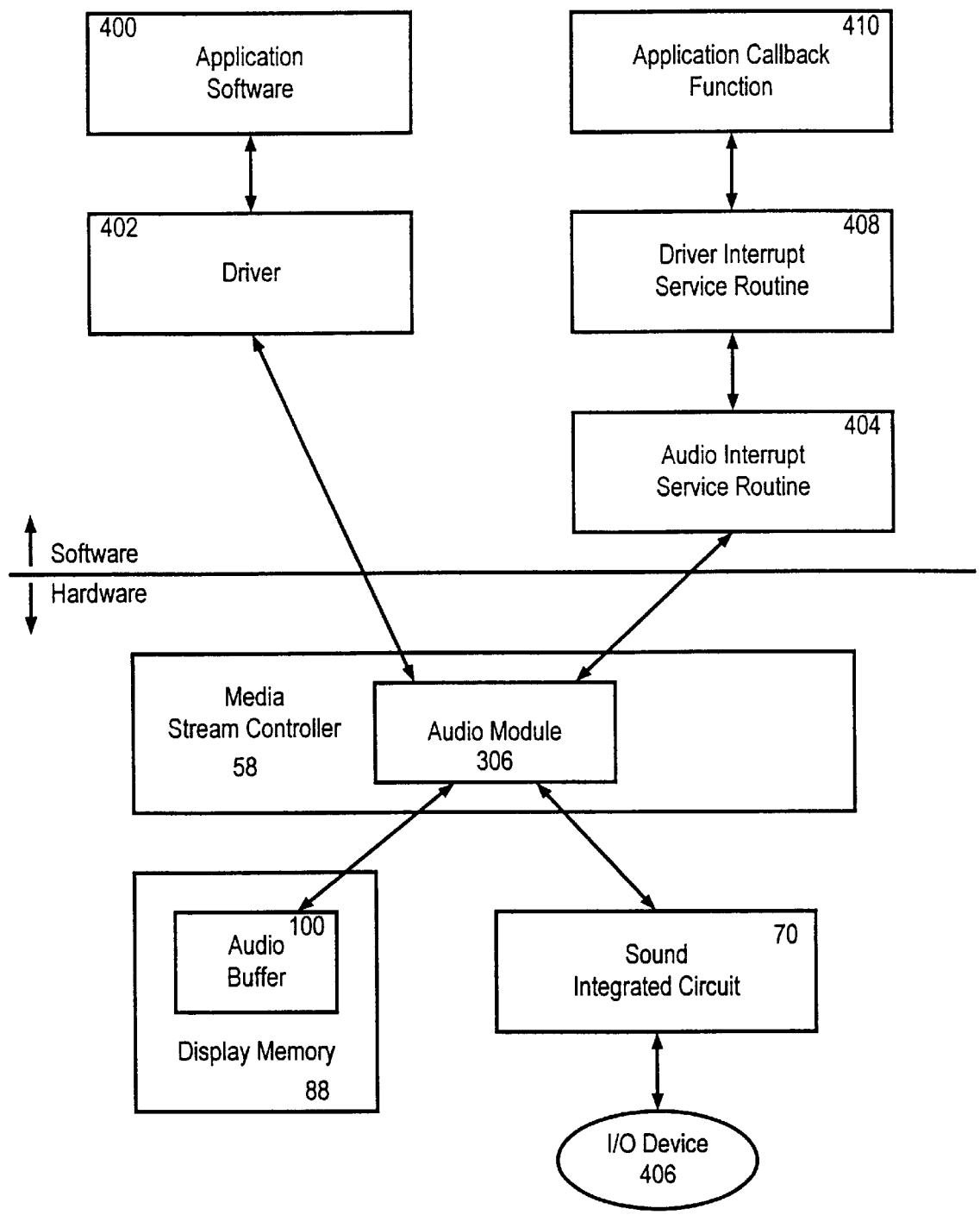
FIG. 4 is a simplified block diagram illustrating how sound is produced in a system according to the first embodiment.

FIG. 4 is a simplified block diagram illustrating how sound is produced in a system according to the first embodiment. Digitized sound I/O is controlled by a software application 400 that sends commands to the Media Stream Controller 58, either directly or through a driver 402 as shown in FIG. 4. To provide compatibility, the first embodiment allows these commands to be sent to the same addresses, in the same format, as is common in typical ISA-based sound systems. The commands may be addressed to an I/O port directly (for instance as an offset of a base address such as 220$h$ or 240$h$) or through addresses that are memory mapped to these ports. The Media Stream Controller 58 will intercept these commands from the high speed I/O Bus 54 and its Main Bus Interface 300 will convert the addresses to internal addresses on the Hbus 302 for the Audio Module 306.

The digitized sound I/O commands and related data transfer are processed primarily by the Audio Module 306 and an Audio Interrupt Service Routine (AISR) 404. The AISR 404 is preferably loaded at boot up as part of the BIOS, and is configured to be activated by an interrupt generated by the Audio Module 306. When the software application 400 sends a command to the Audio Module 306 requesting that a packet of sound data be played, the Audio Module 306 generates an interrupt and the AISR 404 is activated. The AISR 404 reads the command out of registers in the Audio Module 306 and causes part or all of the packet to be transferred through the Media Stream Controller 58 to the Audio Buffer 100 using burst mode block transfer commands executed by the CPU. The Audio Module 306 then transfers the sound data out of the Audio Buffer 100 at the desired frequency, formats it in standard AES/EBU format, and sends it to the Sound Integrated Circuit 70. The Sound Integrated Circuit then plays the sound on an output device 406. When the buffered sound data has finished playing, the Audio Module 306 generates another interrupt to once again activate the AISR 404. If more sound data remains in the packet, the AISR transfers it to the Audio Buffer and the process continues.

Once the entire packet has been played, the AISR generates an effective interrupt which activates the Driver Interrupt Service Routine 408 (or an ISR set up by the application where a driver is not used). Where a driver is used, the Driver Interrupt Service Routine 408 may in turn call an Application Callback Function 410. The effective interrupt is preferably indistinguishable from an interrupt generated by a conventional ISA-based sound card 26. Thus, the Driver ISR 408 and Application Callback Function 410 may operate compatibly with both conventional sound cards and the system of the first embodiment. After being activated by the effective interrupt, the Driver ISR 408 and Application Callback Function 410 may set up additional packets to be transferred or may terminate the digitized sound I/O. If additional packets are sent, the AISR 404 and Audio Module 306 repeat the process described above.

The mechanisms used to allow cooperative processing of digitized sound I/O by the Audio Module 306 and AISR 404 in the first embodiment will now be described in more detail. The processing of digitized sound I/O in the first embodiment uses addresses generally corresponding to registers provided in conventional sound cards. Accesses to these registers are decoded by the main bus interface 300 of the Media Stream Controller 58 and mapped on the Hbus 302 to the Audio Module 306. While the addresses used and the functions performed by accessing them may be compatible with conventional sound cards, the internal structure and operation is specifically designed to allow processing by the Audio Module and AISR in a high speed I/O Bus environment. In particular, an Audio Read Register (ARR) and an Audio Command Register (ACR) may have a conventional portion accessible to a software application for compatibility. They may also have a local portion that is used for the logic and communication of the Audio Module and AISR. In the first embodiment, the ACR and ARR have a separate local portion used for command processing that is not accessed by the application, but is accessed by the AISR. When a value is to be provided to the software application, the value is moved from the local portion of the ARR or ACR to the non-local portion. Table 1 lists the main registers accessible by a software application. The first column lists the address offset for the register. The second column lists the register's name, and the third column lists whether the register allows read (R), or write (W) access.

TABLE 1

| Address Offset | Register Name | Access |
| --- | --- | --- |
| 0x02X6,7 | Audio Reset Register ("Reset") | W |
| 0x02XA,B | Audio Read Register (ARR) | R |
| 0x02XC,D | Audio Command Register (ACR) | W |
| 0x2XC,D | Audio Command Status (ACS) | R |
| 0x02XE,F | Audio Read Status (ARS) | R |

The Reset Register is used to place the Audio Module in an initialized state similar to conventional sound cards. The Reset Register may be implemented in logic rather than using an actual register. In addition to initializing its own logic, the Audio Module sets a reset flag in a status byte of the Audio Command Register (discussed further below) and generates an interrupt to activate the AISR. The AISR then parses the status byte of the Audio Command Register (ACR), detects a reset, and resets its state logic to an initialized state.

The Audio Command Status (ACS) register is read to determine whether the Audio Module is ready to receive a command or data. If the Audio Module is ready, a command or data may be written to the same address, which then functions as the address for the ACR. To read data returned from a command, first the Audio Read Status (ARS) register is read to determine whether the data is ready. If it is ready, the data may be read from the Audio Read Register (ARR).

The processing of digitized sound I/O commands provides the basic mechanism for communication between the Audio Module 306 and the AISR 404 and will now be described in detail. Sound commands are initially received by the Audio Module 306. Depending on the type of command, the Audio Module may process it directly (these commands are referred to as "Passive AM Direct" commands), store its parameters in a register for the AISR to use later (these commands are referred to as "Passive AM Shadow" commands) or generate an interrupt to activate the AISR to process the command (these commands are referred to as "Active AISR" commands). Table 2 illustrates how commands may be categorized for the system of the first embodiment. The first column of Table 2 lists the command code, which is written to the ACR to initiate processing. The second column lists the number and size of parameters for the command, and column three lists the number and size of data parameters returned by the command via the ARR. Column four contains a functional description of the command, and column five indicates how the command is processed by the system of the first embodiment.

TABLE 2

| Cmd | # Parms | Cmd Resp | Functional Description | Processing Method |
| --- | --- | --- | --- | --- |
| 0x10 | 1byte to 2XC | 0 | Direct mode play | "Active" MSR |
| 0x14 | 2bytes to 2XC | 0 | SCD play mode | "Active" AISR |
| 0x16 | 2bytes to 2XC | 0 | 2-bit ADPCM (Single Cycle) | "Active" AISR |
| 0x17 | 2bytes to 2XC | 0 | 2-bit ADPCM w/ref (Single Cycle) | "Active" AISR |
| 0x1C | 0 | 0 | AID play mode | "Active" AISR |
| 0x1F | 0 | 0 | 2-bit ADPCM w/ref (Auto-Init) | "Active" AISR |
| 0x20 | 0 | 1 byte from 2XA | Direct record mode | "Active" AISR |
| 0x24 | 2bytes to 2XC | 0 | SCD record mode | "Active" AISR |
| 0x2C | 0 | 0 | AID record mode | "Active" AISR |
| 0x40 | 1byte to 2XC | 0 | DMA transfer time constant | "Passive" AM Shadow |
| 0x48 | 2bytes to 2XC | 0 | Set transfer size for Auto-Inits | "Passive" AM Shadow |
| 0x74 | 2bytes to 2XC | 0 | 4-bit ADPCM (Single Cycle) | "Active" AISR |
| 0x75 | 2bytes to 2XC | 0 | 4-bit ADPCM w/ref (Single Cycle) | "Active" AISR |
| 0x76 | 2bytes to 2XC | 0 | 3-bit ADPCM (Single Cycle) | "Active" AISR |
| 0x77 | 2bytes to 2XC | 0 | 3-bit ADPCM w/ref (Single Cycle) | "Active" AISR |
| 0x7D | 0 | 0 | 4-bit ADPCM w/ref (Auto-Init) | "Active" AISR |
| 0x7F | 0 | 0 | 3-bit ADPCM w/ref (Auto-Init) | "Active" AISR |
| 0x80 | 2bytes to 2XC | 0 | Pause DMA | "Active" AISR |
| 0x90 | 0 | 0 | HSD Play (Auto-Init) | "Active" AISR |
| 0x91 | 0 | 0 | HSD Play (Single Cycle) | "Active" AISR |
| 0x98 | 0 | 0 | HSD Record (Auto-Init) | "Active" AISR |
| 0x99 | 0 | 0 | HSD Record (Single Cycle) | "Active" AISR |
| 0xA0 | 0 | 0 | Set record mode to mono | "Passive" AM Shadow |
| 0xA8 | 0 | 0 | Set record made to stereo | "Passive" AM Shadow |

TABLE 2-continued

| Cmd | # Parms | Cmd Resp | Functional Description | Processing Method |
|---|---|---|---|---|
| 0xD0 | 0 | 0 | Halt DMA | "Active" AISR |
| 0xD1 | 0 | 0 | Turn Speaker ON | "Active" AISR |
| 0xD3 | 0 | 0 | Turn Speaker Off | "Active" AISR |
| 0xD4 | 0 | 0 | Continue DMA | "Active" AISR |
| 0xD8 | 0 | 1 byte from 2XA | 00:Spkr OFF, 0xFF Spkr ON | "Passive" AM Direct |
| 0xDA | 0 | 0 | Exit AID DMA Mode | "Passive" AM Shadow |
| 0xE0 | 1byte to 2XC | 0 | Invert cmd parameter & read | "Passive" AM Direct |
| 0xE1 | 0 | 2 bytes from 2XA | Version check | "Passive" AM Direct |

Direct commands, such as version check (0xE1) and speaker status (0xD8), are processed directly by logic in the Audio Module and do not require any action by the AISR.

Passive shadow commands are trapped by the Audio Module 306 and the relevant information from the command is placed in an Audio DMA Control Register (ADCR). This information can then be read by the AISR when it processes a DMA command (which is Active). The ADCR is accessible by the AISR through memory mapped I/O. The ADCR is a four byte register. The DMA Time Constant is placed in byte 0, the least significant byte (LSB) of the DMA length is placed in byte 1, the most significant byte (MSB) of the DMA length is placed in byte 2, and a DMA Control Status byte is placed in byte 3. The bits in the DMA Control Status byte may be set to tell the AISR whether stereo or mono play and record are being used, and to indicate whether a new DMA time constant or DMA length has been set.

Active commands are trapped by the Audio Module and stored in the local portion of the Audio Command Register (local ACR). The local ACR contains four registers, each 4 bytes long. Each register may contain a command and associated parameters. For each register, byte 0 is used for the command code, byte 1 is used for the first parameter byte (this is set to 0x00 if not used), byte 2 is used for the second parameter byte (this is set to 0x00 if not used), and byte 3 contains an AISR status byte which is described in more detail below.

When a command/data write is initially detected by the Audio Module 306, the data is latched into byte 0 and the Audio Module looks the command up in a table of known commands to determine the number of parameters it should expect. If there are parameters, the Audio Module will wait to receive the parameters. If the command is a shadow command, the parameters will be placed in the ADCR as described above. If the command is active, the parameters, if any, will be placed in bytes 1 and 2 of the local ACR.

Bit flags may also be set in the AISR status byte to indicate to the AISR that certain events have taken place, such as a reset, an interrupt acknowledge (for AID mode), or the detection of an unknown command. It may also contain a local ARR byte pointer (discussed below). When the active command sequence is complete, the Audio Module will generate an interrupt to activate the AISR. The AISR may then access the information in the local ACR register through memory mapped I/O.

The purpose of having four registers in the local ACR is to support the possibility that the Driver ISR (or Application ISR) called by the AISR may disable interrupts and perform active commands. The AISR will not be able to process these new commands until interrupts are enabled. It is believed that for most practical cases in the first embodiment no more than four active commands will be written by the Driver ISR with interrupts disabled. Thus, the 4-deep local ACR will be able to store all of these commands until interrupts are enabled. The 4-deep buffered local ACR registers operate in a "wraparound" fashion when more than one command is received.

Before an application writes a command or data parameter to the Audio Module, it must first check the status of the register by performing a read on 0x2XC. The Audio Module 306 processes these requests directly. Generally, a signal indicating that the register is ready to receive commands or data parameters is returned. During short periods of time between an interrupt request and an acknowledgment from the AISR, a value of not ready may be returned. In addition, if the 4-deep buffered local ACR registers are ever all full, a not ready value will be returned.

The ADCR and local ACR registers provide the basis for command processing in the first embodiment. When a write to 0x2XC is initially detected by the Audio Module 306, the byte is placed in byte 0 of the local ACR. Then the Audio Module identifies the command, determines whether it is a "direct", "active", or "shadow" mode command, and determines the number of additional parameters required. If the command is non-active, the Audio Module interprets and processes the command. This involves either direct processing (such as issuing a command to get speaker status), or shadowing the command in the ADCR for later use by the AISR. If the command is "active", the Audio Module receives the appropriate number of parameters in the local ACR and generates an interrupt request.

The AISR 404 is then activated by the interrupt controller. The AISR reads the flags in the interrupt status word from an Audio Interrupt Register (AIR) to determine that the Audio Module is the source of the interrupt, and to determine what action has taken place. If a known command is detected, the AISR will then proceed with command processing. In addition, appropriate information will be extracted from the ADCR as necessary. The various actions that may be taken to process different commands are illustrated in a computer program listing for a sample AISR attached at the end of this specification in accordance with 37 CFR §1.96. The computer program listing is entitled Appendix A and is incorporated herein by reference. In addition, the AISR processing for DMA mode commands is described in more detail below. If, on the other hand, an unknown command is detected, the AISR 404 will attempt to determine how many bytes the Audio Module 306 should discard before resuming command processing.

Once a command has been processed, data may be returned through the local portion of the Audio Read Register (local ARR). The local ARR in the first embodiment consists of a 3-byte circular buffer for storing data to be returned to an application, as well as a fourth byte set aside to store control information from the AISR that is used by the Audio Module. A pointer to the current byte in the 3-byte circular buffer is maintained in the AISR status byte of the local ACR. When a data value is returned, it is placed in the current byte by the AISR for active commands and by the Audio Module for passive commands. If two bytes are returned, they are placed in consecutive bytes of the circular buffer. When an application performs a read on this register, the current byte of data is placed in the non-local portion of the ARR, and the pointer is automatically updated to the next location. The last byte of the local ARR is not part of the circular buffer. Rather it is used to pass control information from the AISR to the Audio Module. Its function is similar to the AISR status byte of the local ACR which provides status information from the Audio Module to the AISR. Bit flags are set in the control byte of the local ARR to indicate how many bytes to discard if an unknown command has been detected. Additionally, a flag is set to tell the Audio Module 306 when the AISR 404 has generated an effective interrupt for the Driver ISR 408 at the end of a DMA transfer (discussed further below).

Before an application reads data from the ARR, it should check the Audio Read Status (ARS) register. This register provides a value indicating whether data is ready to be read from the ARR. When multiple bytes are returned by a command, a queue of "ready" flags is set. Each "ready" flag is cleared when the corresponding data byte is read from the ARR by the application. For commands that do not return data, the ARS register returns a value of "not ready".

The above registers provide a basic mechanism for communication between the Audio Module 306 and the AISR 404. It will be readily understood by those of ordinary skill in the art that the information maintained in these registers will be dictated by the functions implemented and by the need for compatibility with existing applications. Additional bit flags may be set in status and control bytes of the registers as necessary. The number and behavior of registers may also be modified to suit the particular application. For instance, a second embodiment may use techniques similar to those discussed above to process commands for an audio mixer chip in a manner compatible with conventional mixer chips. An example is illustrated in the computer program listing for the sample AISR attached at the end of this specification and incorporated herein by reference.

Overview of Operation

Now that the audio sound registers have been described, the transfer of sound data for DMA mode commands will be described in detail. DMA mode commands are handled primarily by two sets of data transfer in the first embodiment—(1) a transfer of data from the main memory to the Audio Buffer, and (2) a transfer from the Audio Buffer to the Sound Integrated Circuit. The first transfer is controlled primarily by the AISR 404 and will be discussed first. The second transfer is controlled primarily by hardware in the Audio Module 306 and will be discussed second. The following description will focus on DMA mode commands for playing sound data in the first embodiment—that is transferring sound data from the main memory to an output device such as a speaker or the like. It will be readily understood that similar techniques may be used to support recording of sound data by transferring data in the opposite direction (from an input device, such as a microphone or the like, to main memory). Both of these techniques are illustrated in the computer program listing for the sample AISR attached at the end of this specification and incorporated herein by reference. Similarly, the techniques described below may be adapted to provide direct mode play and record which are also illustrated in the computer program listing for the sample AISR.

Figure 5:
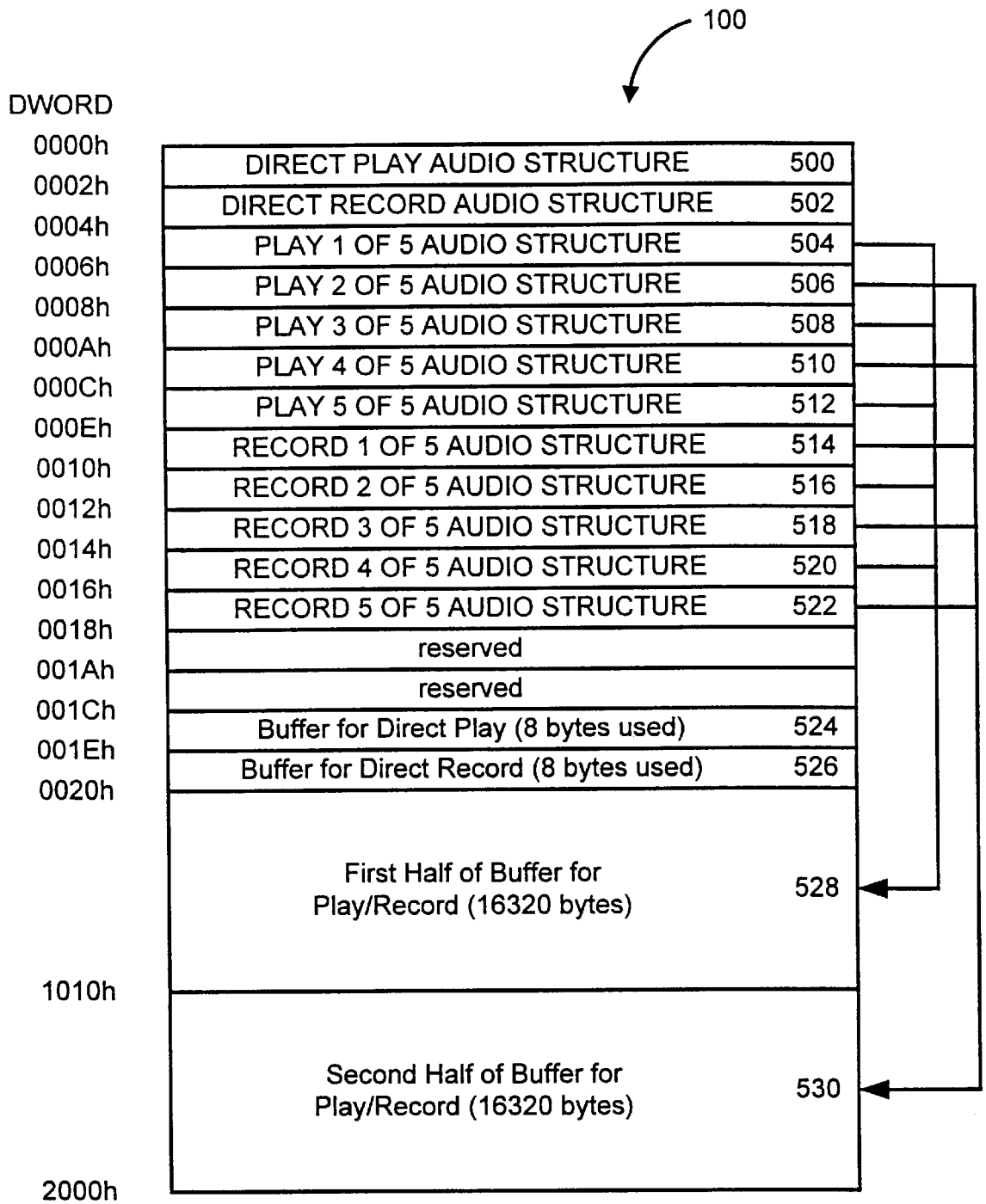
FIG. 5 is a simplified block diagram illustrating the structure of an Audio Buffer according to the first embodiment.

In order to understand the processing of DMA mode commands in the first embodiment, it is helpful to understand the structure of the Audio Buffer 100. The structure of the Audio Buffer for the first embodiment is illustrated in FIG. 5. The Audio Buffer 100 in the first embodiment is a 32 KB buffer in the display memory 88. At the beginning of the Audio Buffer, space is set aside for Audio Structures 500–522 which contain format and control information for the data being transferred. Each Audio Structure consists of two double words. These double words contain information regarding the data block size, the data transfer direction and formatting, as well as some additional information for the data block. Space is also allocated for buffers 524 and 526 to store data being transferred for direct play or record modes.

The rest of the Audio Buffer 100 may be used to buffer data for DMA mode commands. In the first embodiment, 32,640 bits are provided for this purpose. If an application requests a packet to be played that is 32,640 bits or less, the AISR will put the entire packet in this buffer, and the format and control information for the packet will be placed in the PLAY1 Audio Structure 504. It will be recalled, however, that in the ISA based system described above, DMA may be used to transfer a sound packet of up to 64 KB at a time. Therefore, if the packet is larger than 32,640 bits in the first embodiment, a double buffering system is used to transfer the data through the Audio Buffer. Two Play/Record buffers 528 and 530 are set up, each being 16,320 bits. The AISR 404 determines how many 16,320 bit blocks will be necessary to transfer the data and sets up that many Audio Structures in the Audio Buffer 100. A flag is set in the last Audio Structure to indicate that it is the last block in the packet. The AISR 404 then transfers the first 32,640 bits of the sound packet to the Audio Buffer. The format and control information in the PLAY1 Audio Structure 504 are used by the Audio Module to transfer the first 16,320 bits of data (in the first half of the Play/Record Buffer 528) to the Sound Integrated Circuit 70. When this data has been transferred, another block of data from the packet (up to 16,320 bits) is transferred to the first half of the Play/Record buffer 528 by the AISR. This data corresponds to the PLAY3 Audio Structure 508. In the meantime, data may be read out of the second half of the Play/Record buffer 530 to be played by the Sound Integrated Circuit 70. When the data in the second half of the Play/Record buffer 530 has been transferred, a block of data corresponding to the PLAY4 Audio Structure 510 may be transferred to the second half of the Play/Record buffer 530 while the data in the first half (for PLAY3) is being played. This double buffering process continues until the entire packet has been transferred. The number of Audio Structures needed is determined by the number of 16,320 bit blocks required to transfer the entire sound packet. It will be readily understood by those of ordinary skill in the art that five (5) Audio Structures are required to transfer a 64 KB (65,536 bit) packet of sound data. The last buffer will only contain 256 bits. Of course, other sized Audio Buffers could be used. A 16 KB buffer would require as many as nine (9) Audio Structures to transfer a 64 KB sound packet, while a 64 KB buffer would require only two Audio Structures.

Specific Operation

Figure 6:
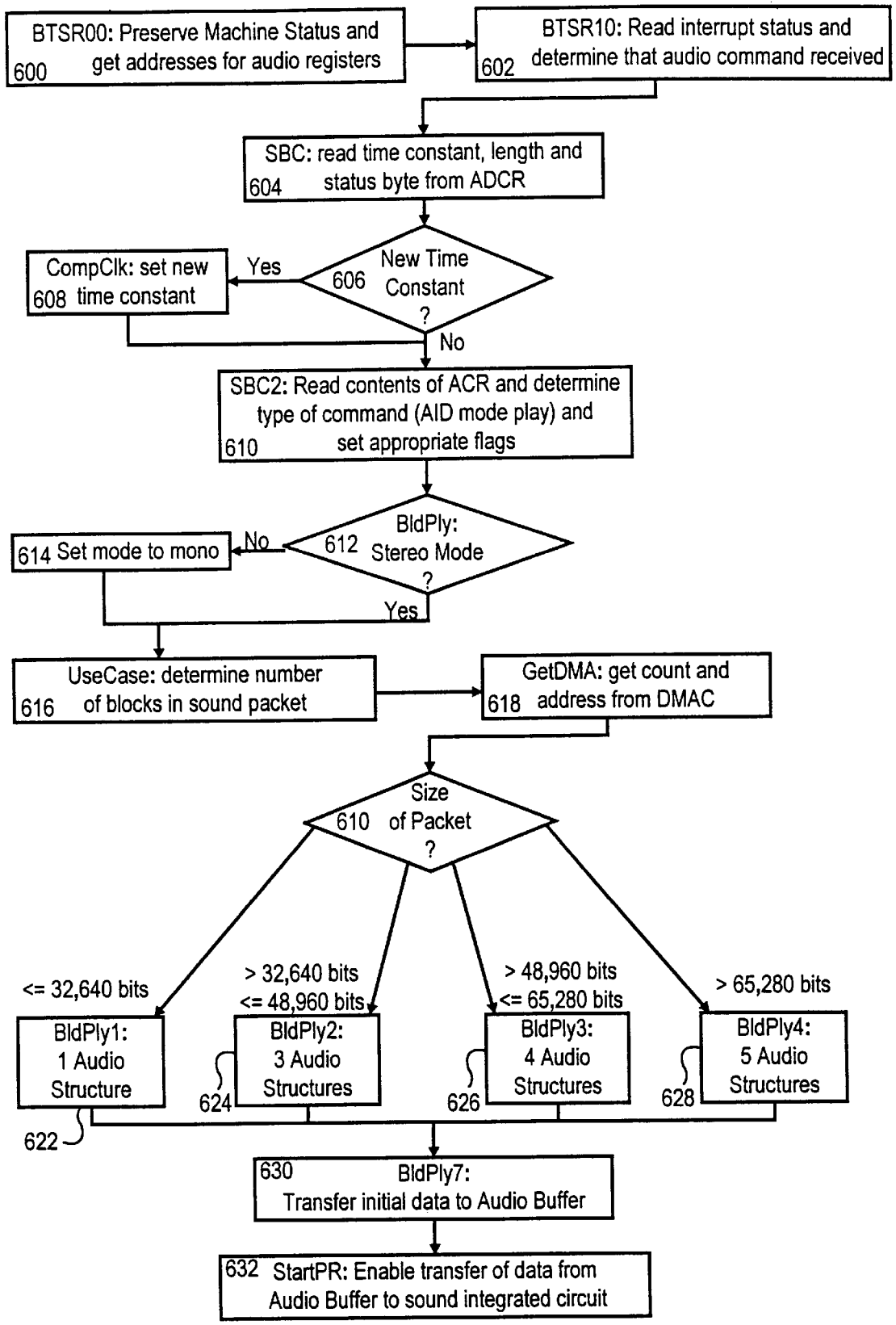
FIG. 6 is a flow chart illustrating initial DMA command processing in an Audio Interrupt Service Routine according to the first embodiment.
Figure 7:
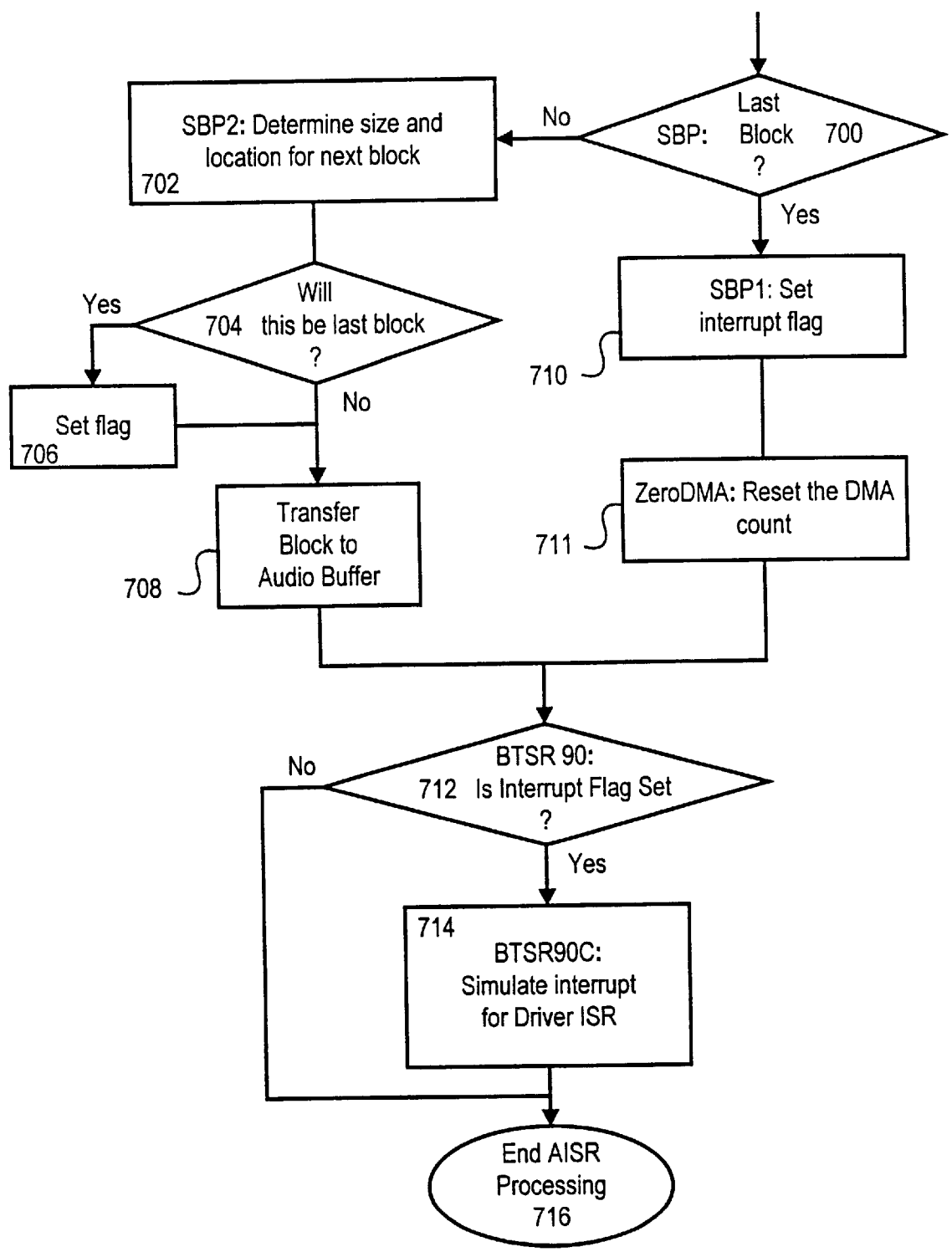
FIG. 7 is a flow chart illustrating secondary DMA command processing in an Audio Interrupt Service Routine according to the first embodiment.

The processing for a sample DMA mode command will now be traced with reference to the computer program listing for the sample AISR attached at the end of this specification and with reference to FIGS. 6 and 7. For illustrative purposes, it will be assumed that an auto-initialize DMA (AID) play mode command (0x1C) is being processed.

As has been discussed previously, the DMA mode commands are initiated by application software 400. The application 400 programs the DMA controller by enabling the DMA channel, providing a base address for the transfer, and by providing a count indicating the number of bytes (or words) to transfer. In addition, the DMA mode is set (in this example the mode would be set to auto-initialize).

The application also sends a command to the Audio Module 306 to set the time constant to control the rate at which the data is sent to the output device. The application may also configure the system to play in stereo or mono. Since auto-initialize mode is being used, the application would also set the transfer size. All of this information is stored by the Audio Module 306 in the ADCR.

The application 400 then sends the AID play mode command (0x1C) to the Audio Module 306. The Audio Module detects the command, places it in the local ACR, and sets a flag in the status byte of the local ACR to indicate that a known command has been detected. Then the Audio Module 306 generates an interrupt to activate the AISR 404, since the AID play mode command is an "active" command.

FIG. 6 is a simplified flow chart illustrating the steps taken by the AISR 404 to process the command. The steps are generally labeled to correspond to the label and procedure names for the corresponding code in the sample AISR computer program listing attached at the end of this specification and incorporated herein by reference. At BTSR00 600, the AISR first saves the state of the machine as is conventional in interrupt service routines. The AISR also sets up the address used to access the audio registers at this point.

At BTSR10 602, the AISR reads the interrupt status from the audio registers and determines the type of interrupt that has occurred. In this case, the AISR determines that an active audio command has been sent to the Audio Module 306. This causes the AISR to jump to the code labeled SBC 604 where the time constant, transfer size, and status byte are retrieved from the ADCR. The status byte is checked to see if a new time constant has been provided as shown in block 606 of FIG. 6. If a new time constant has been provided, the procedure CompClk 608 is called to set the new frequency for sound output. The read of the status byte automatically clears the time constant flag, so this step will be skipped on subsequent calls of the AISR until a different time constant is set.

At SBC2 610, the AISR reads the contents of the local ACR, determines the type of command, and sets appropriate flags to indicate the type of command (in this case 8 bit AID play). Then the procedure BldPly 612 is called. Here the AISR sets up the audio structures in the Audio Buffer. First BldPly sets the mono/stereo mode as illustrated by blocks 612 and 614 of FIG. 6. Then BldPly calls a procedure UseCase 616. This procedure calculates the number of audio structures that will be needed to transfer the sound packet through the Audio Buffer 100. After the AISR returns to BldPly from UseCase 616, a GetDMA 618 procedure is called to get the count and address from the DMA controller. Next BldPly jumps to one of four pieces of code depending on the size of the sound packet as was determined by the UseCase procedure (see block 620 of FIG. 6). BldPly1 622 is used if the packet will fit completely in the Audio Buffer (<=32,640 bits). It configures a single audio structure, and a flag is set to indicate that the transfer will be complete after this block is played. BldPly2 624 is used when three audio structures are necessary (>32,640 bits and <=48,960 bits). BldPly3 626 is used when four audio structures are necessary (>48,960 bits and <=65,280 bits), and BldPly4 628 is used when five audio structures are necessary (>65,280 bits). In each case, the appropriate number of audio structures are configured, and a flag is set in the last audio structure to indicate that the transfer will be complete after that block is transferred.

After the audio structures are configured, the AISR jumps to BldPly7 630 which moves the initial blocks of data into the Audio Buffer 100. Up to 32,640 bits can be moved at this point. Additional sound data will have to be moved to the Audio Buffer on subsequent calls to the AISR 404 using the double buffering technique described previously. The actual data transfer is accomplished using a "rep movsd" assembly language command which repeatedly moves double words of sound data into the Audio Buffer 100 from the main memory address that was retrieved from the DMA controller by the GetDMA 618 procedure. This command causes the CPU to transfer the data across the local bus and high speed I/O bus to the Audio Buffer 100 using high speed burst mode data transfer.

After the initial sound data has been transferred, the StartPR 632 procedure is called. This procedure initializes an audio structure pointer in the Audio Module 306 to point to the PLAY1 audio structure 504 and enables the transfer of data out of the Audio Buffer 100 to the Sound Integrated Circuit 70. It also sets a flag to indicate that DMA transfer is in progress.

The AISR then restores the machine status and chains to the next interrupt service routine for the same level of interrupt to see if any other devices have requested an interrupt. This is the end of the AISR processing until it is reactivated by another interrupt.

The Audio Module 306 then loads the size of the block of data from the PLAY1 audio structure 504 into a counter. The Audio Module 306 then counts through the block of data in the Audio Buffer one sample at a time. Each word is formatted and sent to the Sound Integrated Circuit 70 at the desired frequency. Once the entire block has been transferred, the Audio Module 306 determines whether that was the last block in the packet (based on flags set by the AISR in the PLAY1 audio structure 504). If it is not the last block, the audio structure pointer in the Audio Module 306 automatically increments to point to the next audio structure (in this case PLAY2 506), and the data corresponding to this structure (which is in the second half of the Play/Record buffer 530) begins being formatted and sent to the Sound Integrated Circuit 70. The Audio Module 306 also generates another interrupt to activate the AISR 404. The Audio Module also sets the interrupt status byte in the local ACR to indicate that a block has been transferred as opposed to a new command being received. This is referred to as a primary audio interrupt.

The steps taken by the AISR on the second activation are illustrated in the simplified flow chart of FIG. 7. The AISR first determines that a primary audio interrupt has occurred and jumps to the code labeled SBP 700. The SBP 700 code checks to see if the last block of the packet has been transferred out of the Audio Buffer 100. If the last block has not been transferred, the AISR jumps to SBP2 702 and determines the amount of data left to transfer as well as the location for the next block in the Audio Buffer. If the next block is the last block, a flag will be set as shown in blocks 704 and 706 of FIG. 7. The next block will be transferred into the half of the Play/Record buffer 528 or 530 that was just emptied (see block 708 of FIG. 7). For instance, if the first block of sound data (corresponding to the PLAY1 audio structure 504) was just played out of the first half of the buffer 528, the next block (corresponding to the PLAY3 audio structure 508) will be transferred back into the first half of the Play/Record buffer 528. In the meantime, sound data is being transferred out of the second half of the Play/Record buffer 530 (corresponding to the PLAY2 Audio Structure 506) by the Audio Module 306 to be played by the Sound Integrated Circuit 70. Similarly, after the PLAY2 data has been played, data corresponding to the PLAY4 Audio Structure 510 can be moved into the second half of the audio buffer 530 while data for the PLAY3 Audio Structure 508 is read out of the first half of the Play/Record buffer 528. This double buffering method proceeds until the last block of data is played.

If the AISR determines that the last block in the packet has been played, the SBP1 710 code sets a flag indicating that an interrupt should be generated to tell the Driver ISR 408 that the packet has finished being played. This code also clears the flag indicating that DMA mode transfer is in progress. Then ZeroDMA code 711 is called which resets the count in the DMA controller to the state it would have been in had a DMA transfer actually been performed by the DMA controller. In the first embodiment the count is reset to FFFFFFFF hex. This helps ensure compatibility with applications that use the count of the DMA controller after a DMA transfer. In an alternative embodiment, the count in the DMA controller is decreased after each block transfer to more accurately reflect the amount of data that has been transferred. The count is then completely reset upon the final transfer.

Before the AISR completes processing, code labeled BTSR90 712 is called to check if the interrupt flag is set. If BTSR90 712 determines that the interrupt flag is set, the code at BTSR90C 714 then simulates an interrupt to activate the Driver ISR 408. An "les" assembly language command is used to load a pointer to the Driver ISR 408 and a "call" command is used to execute the code. In this way, the Driver ISR 408 is notified that the transfer of the sound data packet has been completed in a manner generally indistinguishable to the Driver ISR from conventional ISA based sound cards. As with conventional sound cards, the Driver ISR may then request additional packets to be transferred. After the Driver ISR returns, the AISR then restores the status of the machine and chains to the next interrupt service routine.

While the above description focuses upon DMA emulation for playing sound data, it will be readily understood by those of ordinary skill in the art that similar double buffering techniques can be used for recording sound data. For recording data, the AISR sets up the appropriate audio structures and then waits for the respective half of the Play/Record buffer to be filled. Once half of the buffer is filled, an interrupt is generated and the AISR transfers the data to a buffer in main memory. In the meantime, the other half of the Play/Record buffer may be filled with incoming sound data. When the entire packet is transferred to main memory, an effective interrupt is generated for the Driver ISR.

Media Stream Controller

Figure 8A:
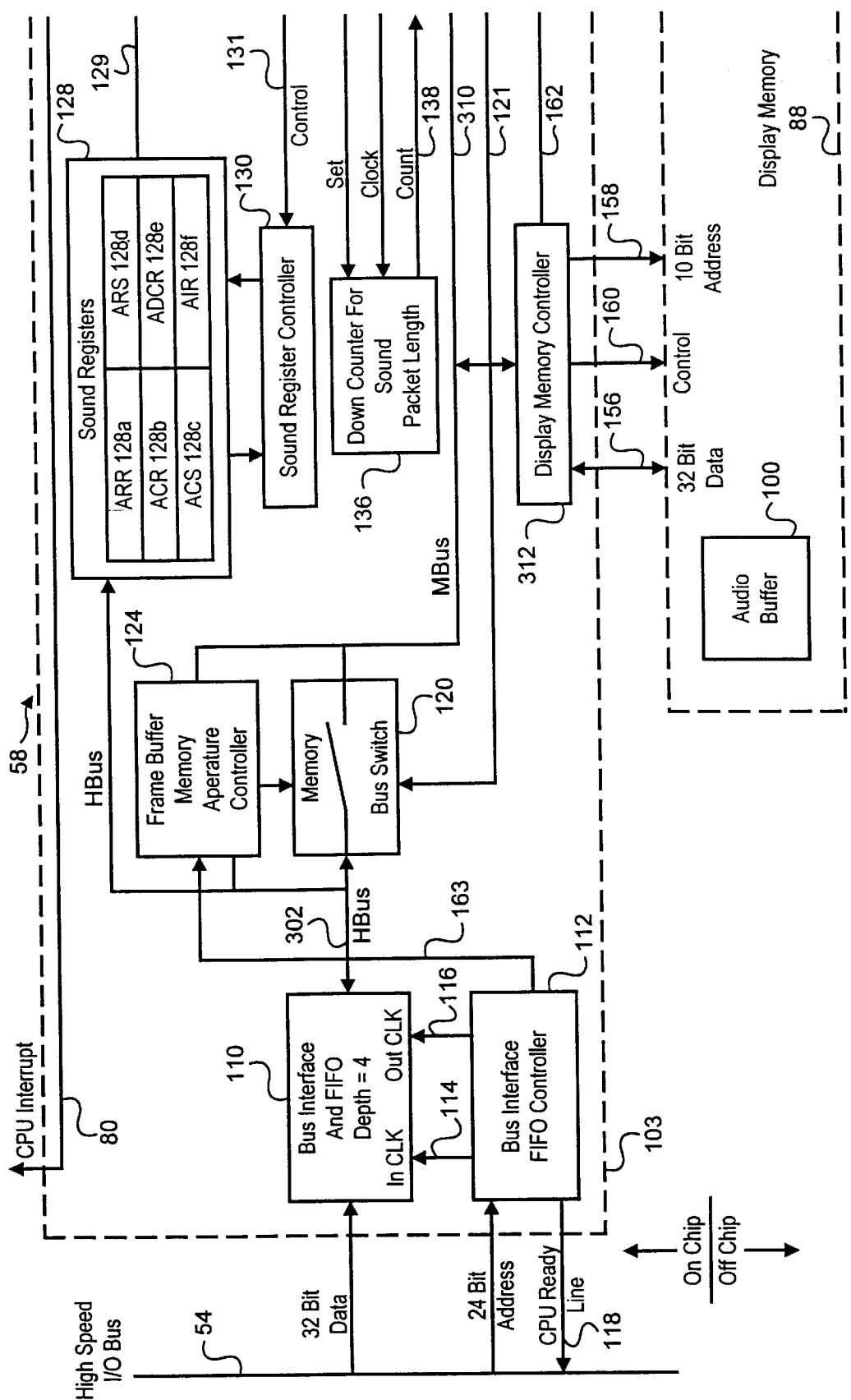
FIGS. 8A and 8B collectively constitute a block diagram showing in additional detail portions of the "Audio Module" block of FIG. 3 as well as related components from the "Multimedia Stream Controller" block of FIG. 3 according to the first embodiment.
Figure 8B:
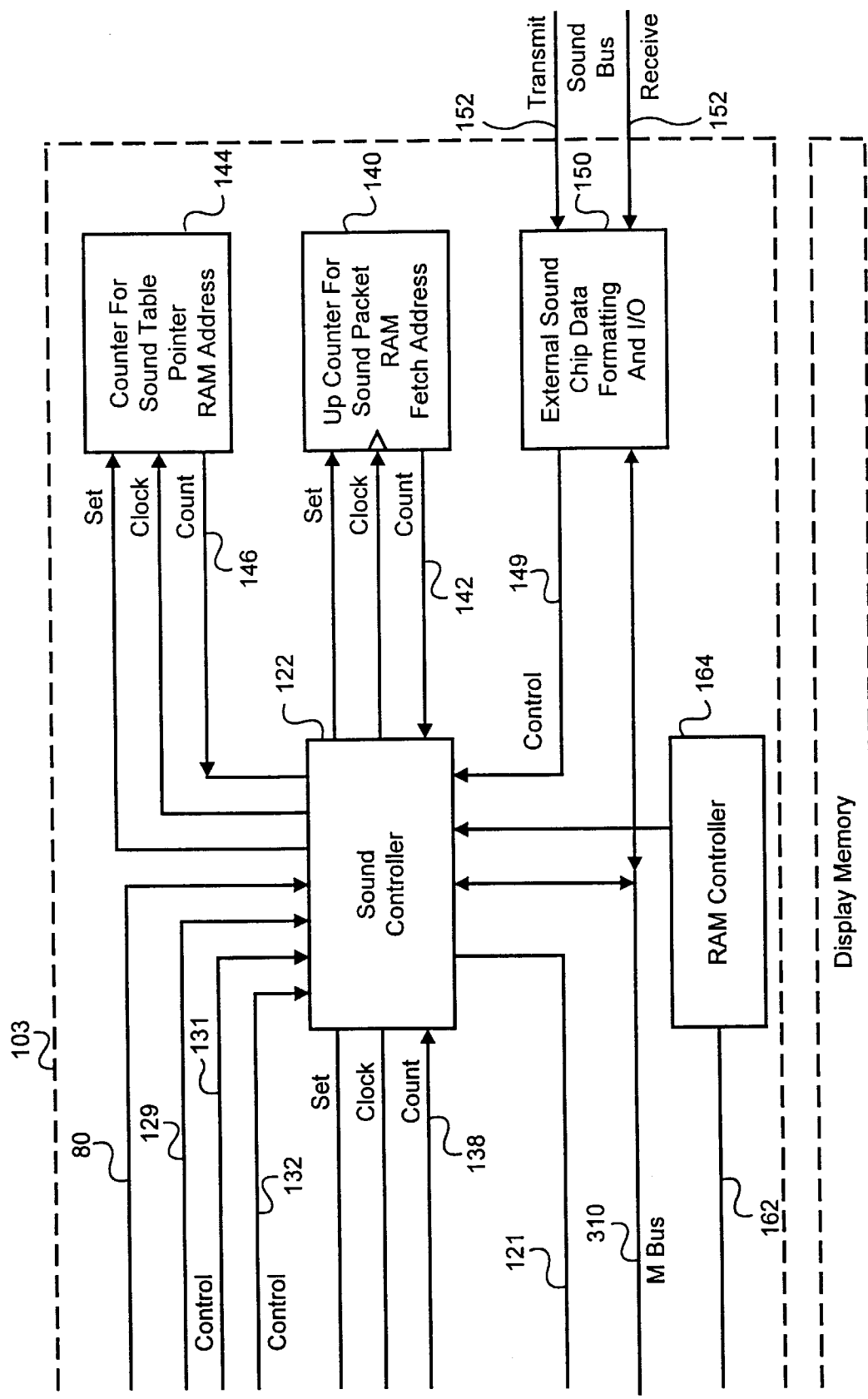

FIGS. 8A and 8B collectively illustrate in additional detail portions of the Audio Module and the Media Stream Controller 58 used for sound processing in the first embodiment as well as the relationship of these portions to the display memory 88. In FIGS. 8A and 8B, the Media Stream Controller 58 is indicated as being enclosed within a rectangle 103 with broken lines. This rectangle may be considered to indicate an integrated circuit chip. An upwardly pointed arrow with a designation of "On Chip" indicates what is in the integrated circuit chip 103. A downwardly pointed arrow with the designation "Off Chip" indicates what is off the integrated circuit chip 103.

A bus interface and FIFO 110 shown in FIG. 8A comprises part of the Main Bus Interface 300 shown in FIG. 3. The FIFO may be formed from a series (e.g., 4) of registers in a first in—first out relationship. The FIFO 110 may be included in a system for providing commands to the display memory 88. Such a system is disclosed and claimed in copending application Ser. No. 08/337,939 filed on Nov. 10, 1994 in the names of David C. Baker and Michael D. Asal as joint inventors, titled "System for and Method of, Processing in Hardware Commands Received from Software Without Polling of the Hardware by the Software", assigned of record to the assignee of record of this application, and incorporated herein by reference. The bus interface and FIFO 110 receives from the high speed I/O bus 54 the samples (which may be Dwords, words, or bytes) of sound data in a packet.

The bus interface and FIFO 110 may operate in time synchronization with a bus FIFO controller 112. The data may be moved into the bus interface and FIFO 110 by an input clock on a line 114 and may be moved out of the bus interface and FIFO by an output clock on a line 116. The bus interface FIFO controller 112 receives from the high speed I/O bus 54 the addresses relating to the words of the sound information in a packet. The bus interface FIFO controller provides an output on a CPU ready line 118 when the registers in the bus interface and FIFO 110 are full.

The output from the bus interface and FIFO 110 is introduced through the HBus 302 to the movable-arm of a switch 120. Although the switch 120 is shown as being a mechanical switch, it is preferably a CMOS bus switch. The switch 120 (FIG. 8A) also receives an input through a bus 121 from a sound controller 122 (FIG. 8B). The output of the switch 120 and the output of a frame buffer memory aperture controller 124 are connected through the MBus 310 to a display memory controller 312 (FIG. 8A) which is disposed within the integrated circuit chip 103. An input terminal of the frame buffer memory aperture controller 124 receives the output of the bus interface and FIFO 110 through the HBus 302. Another input of the frame buffer memory aperture controller 124 also receives an input from the output of the bus interface FIFO controller 112 on line 163. The bus switch 120 and frame buffer memory aperture controller 124 comprise part of the Media Buffer Access Controller 308 shown in FIG. 3.

Sound registers 128 also receive the output from the bus interface and FIFO 110 through the HBus 302. The sound registers 128 make up part of the Audio Module 306 and may include, but are not limited to, the registers listed in Table 1. Several registers corresponding to those described previously are also separately designated as ARR 128a, ACR 128b, ACS 128c, ARS 128d, ADCR 128e, and AIR 128f. These registers correspond to the Audio Read Register (ARR) 128a, Audio Command Register (ACR) 128b, Audio Command Status register (ACS) 128c, Audio Read Status register (ARS) 128d, Audio DMA Control Register (ADCR) 128e, and Audio Interrupt Register (AIR) 128f and have the structure and function described previously. As described previously, the ARR 128a and the ACR 128b may have both a non-local portion accessible to a software application in a conventional manner and a local portion which is used primarily for communicating with the AISR. The output from the sound registers 128 passes through a bus 129 to the sound controller 122 (FIG. 8B) which also makes up part of the Audio Module 306. The sound controller 122 is also coupled through a bus 131 to a sound register controller 130 (FIG. 8A) which provides an input to, and receives an output from, the sound registers 128.

The sound controller 122 (FIG. 8B) has a number of connections to a down counter 136 (FIG. 8A) for the sound packet length. A set line extends from the sound controller 122 to the down counter 136 to decrease the count in the down counter by an integer when a signal is provided on the set line. This down count is synchronized with a clock signal on a clock line. An indication of the count in the down counter 136 is provided to the sound controller on a line 138. The down counter 136 is used to determine when a block of data from the Audio Buffer 100 has finished being transferred. The size of each block of data is loaded into the down counter 136 from the Audio Structures in the Audio Buffer 100. As sound words are transferred to the Sound Integrated Circuit 70, the down counter is decreased. When the down counter 136 reaches 0, the sound controller 122 generates an interrupt on line 80 to activate the AISR and starts processing data for the next Audio Structure.

The sound controller 122 (FIG. 8B) also has a number of connections to an up counter 140 for a sound packet RAM fetch address. The up counter 140 is used to count through and consecutively access the words of sound data in the Play/Record buffers 528 and 530 of the Audio Buffer 100. A signal passes through a set line from the sound controller 122 to the up counter 140 to increase by an integer the address in the up counter 140 which is used to access data in the Play/Record buffers 528 and 530 of the Audio Buffer 100. These increases in the up counter 140 are synchronized with a clock signal from the sound controller 122. The up counter 140 outputs its count to the sound controller 122 through a line 142.

Another counter 144 (designated as a counter for a sound table pointer address) has interconnections with the sound controller 122. Signals pass through a set line from the sound controller 122 to the counter 144 in synchronization with a clock signal on a clock line. The counter 144 outputs its count to the sound controller 122 through a line 146. The counter 144 is used to count through the Audio Structures in the Audio Buffer 100. When the down counter 136 indicates that the current block has been transferred, the counter 144 jumps to the next Audio Structure (provided more data remains to be transferred). The length of the block for that Audio Structure is then placed in the down counter 136 and data transfer continues. In the meantime, the AISR may transfer data to or from the half of the Play/Record buffer 528 or 530 that is not being addressed by the counters. Thus, half of the Play/Record buffer is being used to transfer data to or from the Sound Integrated Circuit 70 under the control of the Sound Controller 122 and its various counters (all of which make up part of the Audio Module 306), while the other half of the Play/Record buffer is used to transfer data to or from main memory 12 under the control of the AISR 404.

Control signals extend through a line 149 between the sound controller 122 and an external sound chip data formatting and I/O block 150. The data formatting and I/O block 150 is also connected to the MBus 310. A sound bus 152 is connected to the data formatting and I/O block 150 to transmit or receive sound information. The data formatting and I/O block 150 use the format information stored in the Audio Structures to format the data for the Sound Integrated Circuit 70 before it is sent to be played. A standard AES/EBU formatting may be used. The data formatting and I/O block 150 also converts recorded data received from the Sound Integrated Circuit 70 into the appropriate format before it is placed in the Audio Buffer 100.

A plurality of outputs are provided from the display memory controller 312 (FIG. 8A) to the display memory 88. One of these outputs is coupled to a bus 156 for transferring words of sound data into the display memory 88. Another of these outputs is provided on a bus 158 to indicate addresses. A third of these outputs is provided on a bus 160 to provide control information. The display memory controller 312 receives signals on a bus 162 from a RAM controller 164 (FIG. 8B) which is disposed on the chip 103. The controller 164 has a common connection with the MBus 310 and with the sound controller 122.

When sound data is transferred between the main memory and the Audio Buffer 100. it passes through the bus interface and FIFO 110, the switch 120, and the display memory controller 312.

The bus interface FIFO controller 112 (FIG. 8A) receives from the high speed I/O bus 54 the addresses (24 bits wide) relating to the words of the sound information or data in a packet. These words of sound information or data (32 bits wide) pass into the bus interface and FIFO 110 from the high speed I/O bus 54 in synchronization with a clock signal (with a suitable frequency such as 33 megahertz) on the line 114 from the bus interface FIFO controller 112. After passing through the bus interface and FIFO 110 (a depth of 4 words), the words of the sound information or data in the packet pass to the switch 120.

The switch 120 (FIG. 8A) is normally in the open state. When the frame buffer memory aperture controller 124 receives a command through the bus 163 from the bus interface and FIFO controller 112 that the words of the sound information in a packet are being provided, the controller 124 causes the switch 120 to become closed. The words of the sound information or data in the packet then pass from the bus interface and FIFO 110 through the switch 120, the MBus 310 and the display memory controller 312 to the display memory 88 for recording in the Audio Buffer 100. The operation of the display memory controller 312 in passing such words of sound data in the packet for recording in the display memory 88 is controlled by the RAM controller 164 (FIG. 8B).

As previously described, the bus interface and FIFO 110 (FIG. 8A) has a limited depth, such as four (4) words. Ordinarily, the words of the sound information pass through the bus interface and FIFO 110 at such a rate that the interface and FIFO is not completely full. It may occasionally happen, however, that the interface and FIFO 110 becomes full. When this occurs, the bus interface FIFO controller 112 produces a low voltage on the CPU ready line 118 in FIG. 8A. This prevents the CPU main memory 12 in FIG. 2 from passing any sound words through the high speed I/O bus 54 (FIGS. 2 and 8A) to the bus interface and FIFO 110 (FIG. 8A) until the bus interface and FIFO becomes at least partially empty. However, the bus interface and FIFO 110 becomes almost instantaneously partially empty because of the rapid transfer of the sound packets from the interface and FIFO to the display memory 88.

When sound data is transferred between the Audio Buffer 100 and the Sound Integrated Circuit 70, it passes through the display memory controller 312 and the data formatting and I/O block 150. The formatting and control information in the Audio Structure is pointed to by the sound table pointer address counter 144. In addition, this Audio Structure determines whether sound data is processed from the first half of the buffer for Play/Record 528 (in FIG. 5) or the second half of the buffer for Play/Record 530 (in FIG. 5). For DMA play mode commands, the sound table pointer address counter 144 will count consecutively through the five (5) Play Audio Structures 504–512 (in FIG. 5) until the entire sound packet has been played. For DMA record mode commands, the sound table pointer address counter 144 will count consecutively through the five (5) Record Audio Structures 514–522 until the entire sound packet has been recorded.

While processing an individual block of sound data, the offset into the appropriate half of the Play/Record buffer 528 or 530 for an individual sound word is determined by the up counter 140. The up counter 140 counts through consecutive words in the Play/Record buffer 528 or 530 until the entire block of data has been processed.

The down counter 136 determines when a block of data has finished being processed. The down counter 136 is initially loaded with the size of the block which is stored in the Audio Structure. At each individual sound word, the down counter 136 is decremented. When it reaches zero (0) the entire block has been transferred. At this time, the sound table pointer address counter 144 is incremented to point to the next Audio Structure and the up counter 140 for the sound packet RAM fetch address is reset. The length of the new block is loaded from the Audio Structure into the down counter 136 and processing begins for the new block of sound data. In addition, the sound controller 122 generates an interrupt request for the AISR, since a block of data has been processed. For DMA mode play, the AISR may move a new block into the half of the Play/Record buffer 528 or 530 that was just emptied. For DMA mode record, the AISR may transfer the recorded block out of the half of the Play/Record buffer 528 or 530 that was just filled. As discussed previously, this process continues until the entire sound packet has been processed.

The system shown in FIGS. 8A and 8B has certain advantages when used as part of the Media Stream Controller 58 in the system shown in FIG. 2. One advantage is that it is disposed on the integrated circuit chip 103. Another advantage is that it causes the Media Stream Controller 58 to be compatible with the system of the prior art as shown in FIG. 1. This is desirable, for example, to prevent all of the video games and other software applications written for the system of FIG. 1 from becoming obsolete. This compatibility is established since a software application can still initiate a transfer by sending an indication to the DMA controller 16 in FIG. 2 of the number of words to be recorded in a packet in the display memory 88. Then the AISR can return to reset the count in the DMA controller after the transfer of such words to the display memory and the recovery of such words from the display memory for playing or recording sound. In an alternative embodiment, the AISR may reduce the count in the DMA controller at a desired resolution during the transfer of sound data. Using such a technique would cause the count in the DMA controller to more accurately reflect the amount of data that has been transferred at any given time.

The system shown in FIGS. 8A and 8B is also advantageous because it provides for a transfer of the words of the sound information in a block into the display memory 88 at a relatively rapid rate. This occurs at the same time that the words previously recorded in the display memory 88 in another block are being processed at a substantially constant rate (consistent with the production of optimal sound) to recover the sound represented in such words. Furthermore, by transferring the words of the sound data or information into an individual portion of the audio buffer 100 at a rapid rate, the high speed bus 54 and local bus 20 become available to process other commands while the words of the sound information in the other portion of the audio buffer is still being converted to sound. This also frees up bus bandwidth for other uses such as graphics and video.

Another advantage of the invention is that the words of sound information are stored in display memory 88. The display memory has a large storage capacity. Relatively little capacity is lost by providing a small portion of the display memory 88 for the storage of the words of sound information. Furthermore, the storage of the words of sound information is only temporary since the stored words are processed to recover the sound represented by the indications in such packets.

The temporary storage of the words of sound information in the Audio Buffer 100 of the display memory 88 offers other advantages, particularly since commands and graphics and video information are also stored in the display memory 88. This reduces considerably the number of memories used in the system incorporating this invention. Since memories are relatively expensive, the cost of the system of this invention is considerably reduced compared to the systems of the prior art.

The foregoing description is presented to enable any person skilled in the art to make and use the invention. Descriptions of specific designs are provided only as examples. Various modifications to the preferred embodiment will be readily apparent to those skilled in the art, and the generic principles defined herein may be applied to other embodiments and applications without departing from the spirit and scope of the invention. Thus, the present invention is not intended to be limited to the embodiments shown, but is to be accorded the widest scope consistent with the principles and features disclosed herein.

For instance, the system of passive and active commands described above may be used to process sound mixer commands or other commands using an interrupt service routine even when DMA mode data transfer is not desired. By using an ISR for command processing, the hardware may be kept relatively simple and inexpensive. In addition, a similar system may be used for non-sound command processing.

In addition, a buffer other than the VRAM of a display memory may be provided for storing sound words. This may allow a sound system according to the present invention to be developed independently of the graphics and video systems in cases where that may be desirable.

It will also be realized that the techniques of the present invention are broadly applicable and are not limited to any particular bus systems or computer architectures. Aspects of the present invention may be applicable any time it is desirable to support a bus device on a second bus having a second mode of data transfer in a manner compatible with a first bus having a first mode of data transfer.

In addition, the techniques of data transfer, command processing, and double buffering may be applied in numerous situations even where backwards compatibility is not a concern.

While this invention has been described and illustrated with reference to particular embodiments, it will be readily apparent to those skilled in the art that the scope of the present invention is not limited to the disclosed embodiments but, on the contrary, is intended to cover numerous other modifications and equivalent arrangements which are included within the spirit and scope of the following claims.

We claim:

1. A system for emulating direct memory access transfer of data between a first device and a second device comprising:

a DMA controller wherein the DMA controller is programmed with at least one parameter for the DMA transfer of the data between the first device and the second device;

a bus system operatively coupling the first device and the second device; and a processing unit operatively coupled to the bus system;

wherein the processing unit is programmed to cause at least a portion of the data to be transferred between the first device and the second device across the bus system independently of the control of the DMA controller and to provide an updated value for the at least one parameter to the DMA controller to reflect the transfer of at least the portion of the data between the first device and the second device.

2. The system of claim 1 wherein the processing unit is programmed to obtain an initial value for the parameter from the DMA controller.

3. The system of claim 1 wherein the at least one parameter is a count indicative of an amount of data to be transferred.

4. The system of claim 1 wherein:

the first device comprises a system memory; and the second device comprises a sound processing device operatively coupled to an audio buffer.

5. The system of claim 1 wherein the processing unit is programmed to provide multiple incremental updated values for the at least one parameter to the DMA controller during the transfer of the portion of the data to reflect the progress of the transfer.

6. The system of claim 4 wherein the sound processing device receives a request for the DMA transfer of the data, and the request for the DMA transfer of the data is a request to transfer a block of sound related data to be played or recorded by the sound processing device.

7. The system of claim 1 wherein the data is transferred using burst mode data transfer.

8. The system of claim 4 further comprising a display memory for storing graphics related data, video related data and sound related data;

wherein the audio buffer is provided in the display memory.

9. The system of claim 4 further comprising a sound I/O device;

wherein the sound processing device transfers the data between the audio buffer and the sound I/O device at a desired frequency for inputting or outputting sound.

10. The system of claim 1 wherein:

the processing unit is programmed to obtain an initial value for the parameter from the DMA controller;

the at least one parameter is a count indicative of an amount of data to be transferred; and the processing unit is programmed to provide multiple incremental updated values for the at least one parameter to the DMA controller during the transfer of the portion of the data to reflect the progress of the transfer.

11. The system of claim 10 wherein:

the first device comprises a system memory;

the second device comprises a sound processing device operatively coupled to an audio buffer; and the sound processing device receives a request for the DMA transfer of the data, and the request for the DMA transfer of the data is a request to transfer a block of sound related data to be played or recorded by the sound processing device.

12. The system of claim 11 further comprising a sound I/O device;

wherein the sound processing device transfers the data between the audio buffer and the sound I/O device at a desired frequency for inputting or outputting sound.

13. A method for emulating direct memory access (DMA) transfer of data between a first device and a second device in a system wherein a DMA controller is programmed with at least one parameter for the DMA transfer of the data, the method comprising the steps of:

receiving a request for the DMA transfer of the data;

causing at least a portion of the data to be transferred between the first device and the second device independently of the control of the DMA controller; and providing an updated value for the at least one parameter to the DMA controller to reflect the transfer of at least the portion of the data between the first device and the second device.

14. The method of claim 13 further comprising the step of obtaining an initial value for the parameter from the DMA controller.

15. The method of claim 13 wherein the at least one parameter is a count indicative of an amount of data to be transferred.

16. The method of claim 13 further comprising the step of providing multiple incremental updated values for the at least one parameter to the DMA controller during the transfer of the portion of the data to reflect the progress of the transfer.

17. The method of claim 13 wherein the portion of the data is transferred using burst mode data transfer.

18. The method of claim 13 comprising the step of using at least the portion of the data transferred between the first device and the second device to play or record sound.

19. The method of claim 14 further comprising the step of providing multiple incremental updated values for the at least one parameter to the DMA controller during the transfer of the portion of the data to reflect the progress of the transfer;

wherein the at least one parameter is a count indicative of an amount of data to be transferred.

20. The method of claim 14 further comprising the step of using at least the portion of the data transferred between the first device and the second device to play or record sound.

* * * * *